US012621804B2

(12) United States Patent
Lee et al.

(10) Patent No.: US 12,621,804 B2
(45) Date of Patent: May 5, 2026

(54) METHOD AND DEVICE FOR SELECTING RESOURCE ON BASIS OF LCH IN NR V2X

(71) Applicant: LG ELECTRONICS INC., Seoul (KR)

(72) Inventors: Seungmin Lee, Seoul (KR); Jongwoo Hong, Seoul (KR); Seoyoung Back, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 18/268,180

(22) PCT Filed: Dec. 16, 2021

(86) PCT No.: PCT/KR2021/019227
§ 371 (c)(1),
(2) Date: Jun. 16, 2023

(87) PCT Pub. No.: WO2022/131831
PCT Pub. Date: Jun. 23, 2022

(65) Prior Publication Data
US 2024/0057036 A1 Feb. 15, 2024

(30) Foreign Application Priority Data
Dec. 16, 2020 (KR) ........................ 10-2020-0176688

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04W 72/12* (2013.01); *H04W 72/25* (2023.01)

(58) Field of Classification Search
CPC ... H04L 1/1812; H04L 1/1864; H04L 1/1887; H04L 2001/0092; H04W 4/40;
(Continued)

(56) References Cited

U.S. PATENT DOCUMENTS 11,109,363 B2 * 8/2021 Huang .................. H04L 1/1896
12,273,295 B2 * 4/2025 Wang .................... H04W 72/20
(Continued)

OTHER PUBLICATIONS

European Patent Office Application Serial No. 21907135.4, Search Report dated Oct. 10, 2024, 8 pages.
(Continued)

*Primary Examiner* — Eron J Sorrell
(74) *Attorney, Agent, or Firm* — LEE, HONG, DEGERMAN, KANG & WAIMEY

(57) ABSTRACT

An embodiment proposes a method for performing wireless communication by a first device. The method may comprise the steps of: selecting a first resource within a first selection window on the basis of first sensing; generating a first medium access control (MAC) protocol data unit (PDU) on the basis of at least one logical channel (LCH) in which hybrid automatic repeat request (HARQ) feedback is enabled; transmitting, to a second device, first sidelink control information (SCI) for scheduling a first physical sidelink shared channel (PSSCH), through a first physical sidelink control channel (PSCCH), on the basis of the first resource; and transmitting, to the second device, second SCI and the first MAC PDU, through the first PSSCH, on the basis of the first resource. For example, random selection of the first resource may not be allowed on the basis of the at least one LCH in which the HARQ feedback is enabled.

14 Claims, 16 Drawing Sheets

(51) Int. Cl.
*H04W 72/12* (2023.01)
*H04W 72/25* (2023.01)

(58) Field of Classification Search
CPC ..... H04W 72/02; H04W 72/12; H04W 72/25;
H04W 72/40; H04W 92/18
See application file for complete search history.

(56) References Cited

U.S. PATENT DOCUMENTS

| | | | |
|---|---|---|---|
| 2020/0260472 A1* | 8/2020 | Ganesan ................. | H04W 4/46 |
| 2021/0152408 A1* | 5/2021 | Yeo ....................... | H04L 5/0094 |
| 2021/0227465 A1* | 7/2021 | Kung ................... | H04W 76/28 |
| 2021/0352624 A1* | 11/2021 | Akkarakaran ........ | H04W 72/02 |
| 2023/0084593 A1* | 3/2023 | Hoang ............... | H04W 72/542 |
| | | | 370/311 |

OTHER PUBLICATIONS

Huawei et al., "Correction on the SL process handling," 3GPP TSG-RAN WG2 Meeting #112-e, R2-2010955, Dec. 2020, 12 pages.
LG Electronics Inc., "Discussion on resource allocation for power saving," 3GPP TSG RAN WG1 Meeting #103-e, R1-2007895, Nov. 2020, 5 pages.

\* cited by examiner

Resource grid

A carrier
(up to 3300 subcarriers,
i.e., 275 RBs)

A BWP

1RB=12 subcarriers

1 RE 1 symbol

1subcarrier k=0 l=0

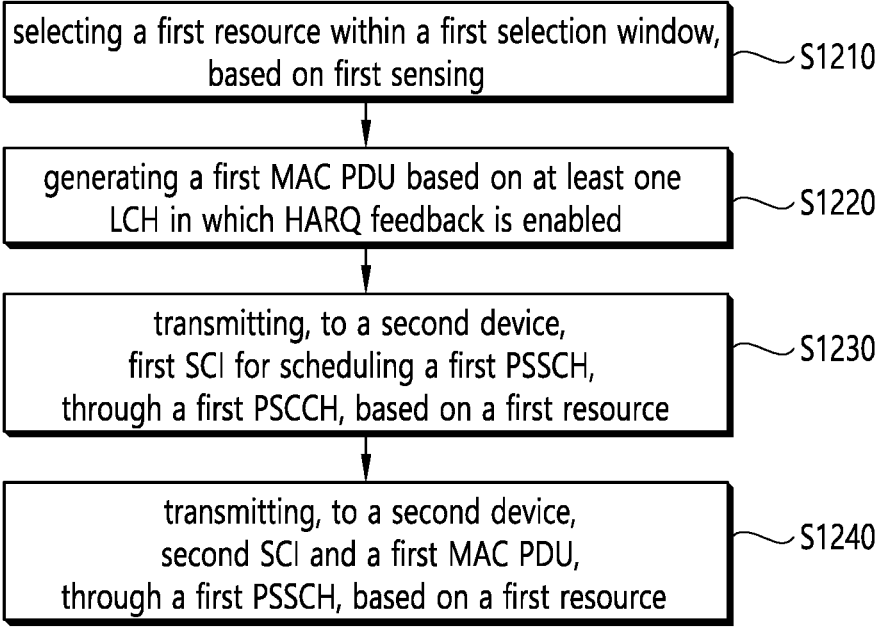

selecting a first resource within a first selection window, based on first sensing — S1210 generating a first MAC PDU based on at least one LCH in which HARQ feedback is enabled — S1220 transmitting, to a second device, first SCI for scheduling a first PSSCH, through a first PSCCH, based on a first resource — S1230 transmitting, to a second device, second SCI and a first MAC PDU, through a first PSSCH, based on a first resource — S1240

FIG. 13

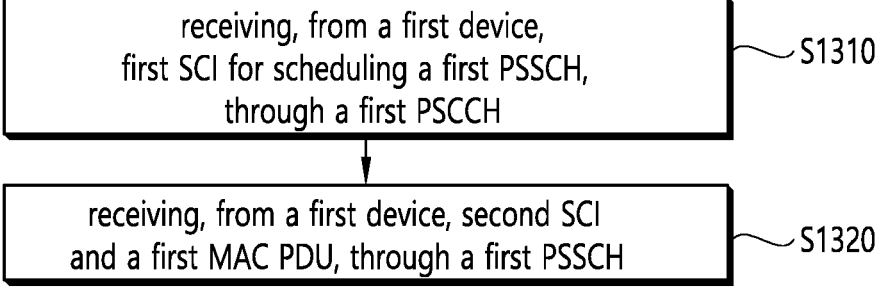

receiving, from a first device, first SCI for scheduling a first PSSCH, through a first PSCCH — S1310 receiving, from a first device, second SCI and a first MAC PDU, through a first PSSCH — S1320

FIG. 17

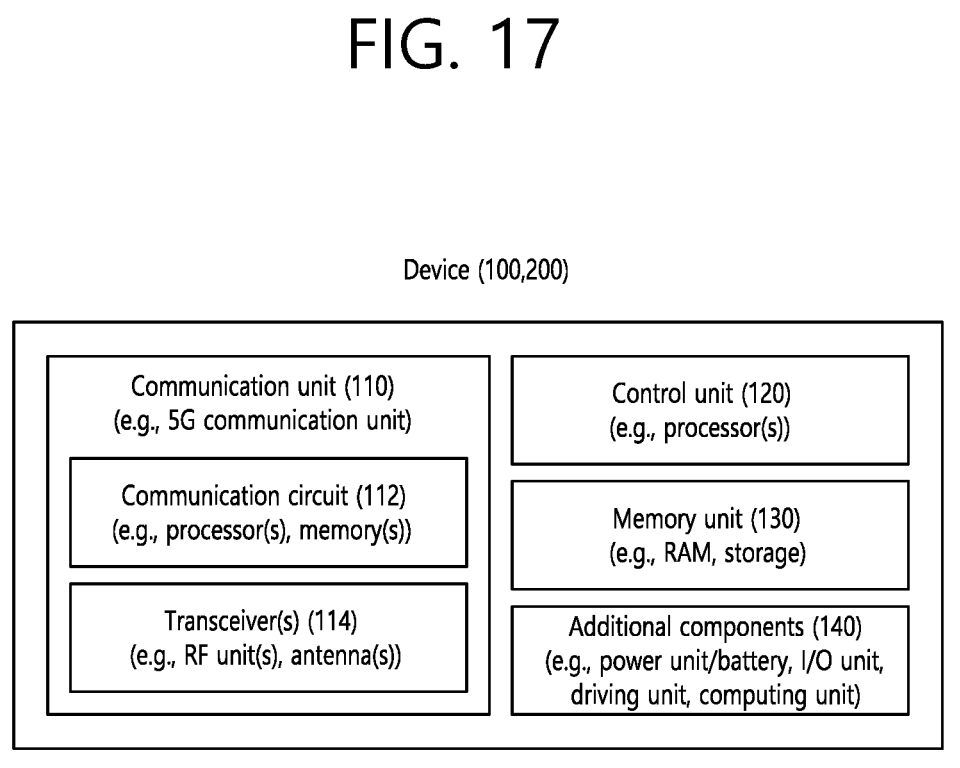

Device (100,200)

| Communication unit (110)<br>(e.g., 5G communication unit) | Control unit (120)<br>(e.g., processor(s)) |
|---|---|
| Communication circuit (112)<br>(e.g., processor(s), memory(s)) | Memory unit (130)<br>(e.g., RAM, storage) |
| Transceiver(s) (114)<br>(e.g., RF unit(s), antenna(s)) | Additional components (140)<br>(e.g., power unit/battery, I/O unit,<br>driving unit, computing unit) |

FIG. 19

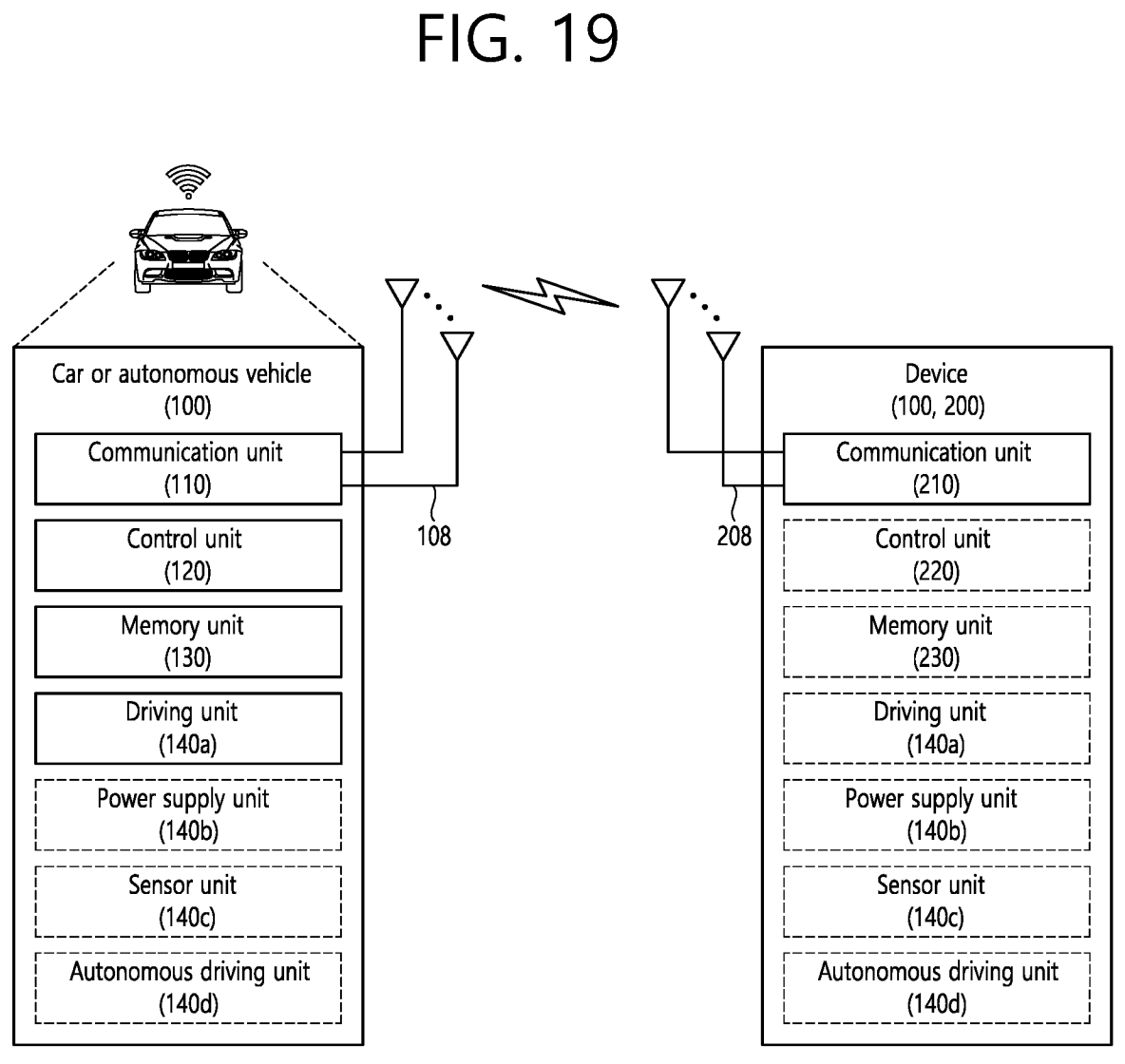

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

108

METHOD AND DEVICE FOR SELECTING RESOURCE ON BASIS OF LCH IN NR V2X

CROSS-REFERENCE TO RELATED APPLICATION(S)

This application is the National Stage filing under 35 U.S.C. 371 of International Application No. PCT/KR2021/019227, filed on Dec. 16, 2021, which claims the benefit of earlier filing date and right of priority to Korean Application No. 10-2020-0176688, filed on Dec. 16, 2020, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

On the other hand, in sidelink communication, when establishing a pool to a UE, whether random selection or partial sensing is performed may always be configured. In this case, for example, if a UE performs random selection or partial sensing, a parameter related to enabling sidelink hybrid automatic repeat request (SL HARQ) feedback (e.g., sl-HARQ-FeedbackEnabled) is enabled and a physical sidelink feedback channel (PSFCH) is configured, the UE may perform SL HARQ feedback operation. For example, if a UE performs random selection, there are no sensing results, so the UE may have a problem with retransmission judgment if there is a collision when receiving ACK/NACK based on PSFCH resources.

BRIEF DESCRIPTION OF THE DRAWINGS

According to an embodiment of the present disclosure, a method for performing, by a first device, wireless communication may be proposed. The method may comprise: selecting a first resource within a first selection window, based on first sensing; generating a first medium access control (MAC) protocol data unit (PDU) based on at least one logical channel (LCH) in which hybrid automatic repeat request (HARQ) feedback is enabled; transmitting, to a second device, first sidelink control information (SCI) for scheduling a first physical sidelink shared channel (PSSCH), through a first physical sidelink control channel (PSCCH), based on the first resource; and transmitting, to the second device, second SCI and the first MAC PDU, through the first PSSCH, based on the first resource. For example, random selection for the first resource may be not allowed, based on HARQ feedback being enabled in the at least one LCH.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: select a first resource within a first selection window, based on first sensing; generate a first medium access control (MAC) protocol data unit (PDU) based on at least one logical channel (LCH) in which hybrid automatic repeat request (HARQ) feedback is enabled; transmit, to a second device, first sidelink control information (SCI) for scheduling a first physical sidelink shared channel (PSSCH), through a first physical sidelink control channel (PSCCH), based on the first resource; and transmit, to the second device, second SCI and the first MAC PDU, through the first PSSCH, based on the first resource. For example, random selection for the first resource may be not allowed, based on HARQ feedback being enabled in the at least one LCH.

Figure 1:
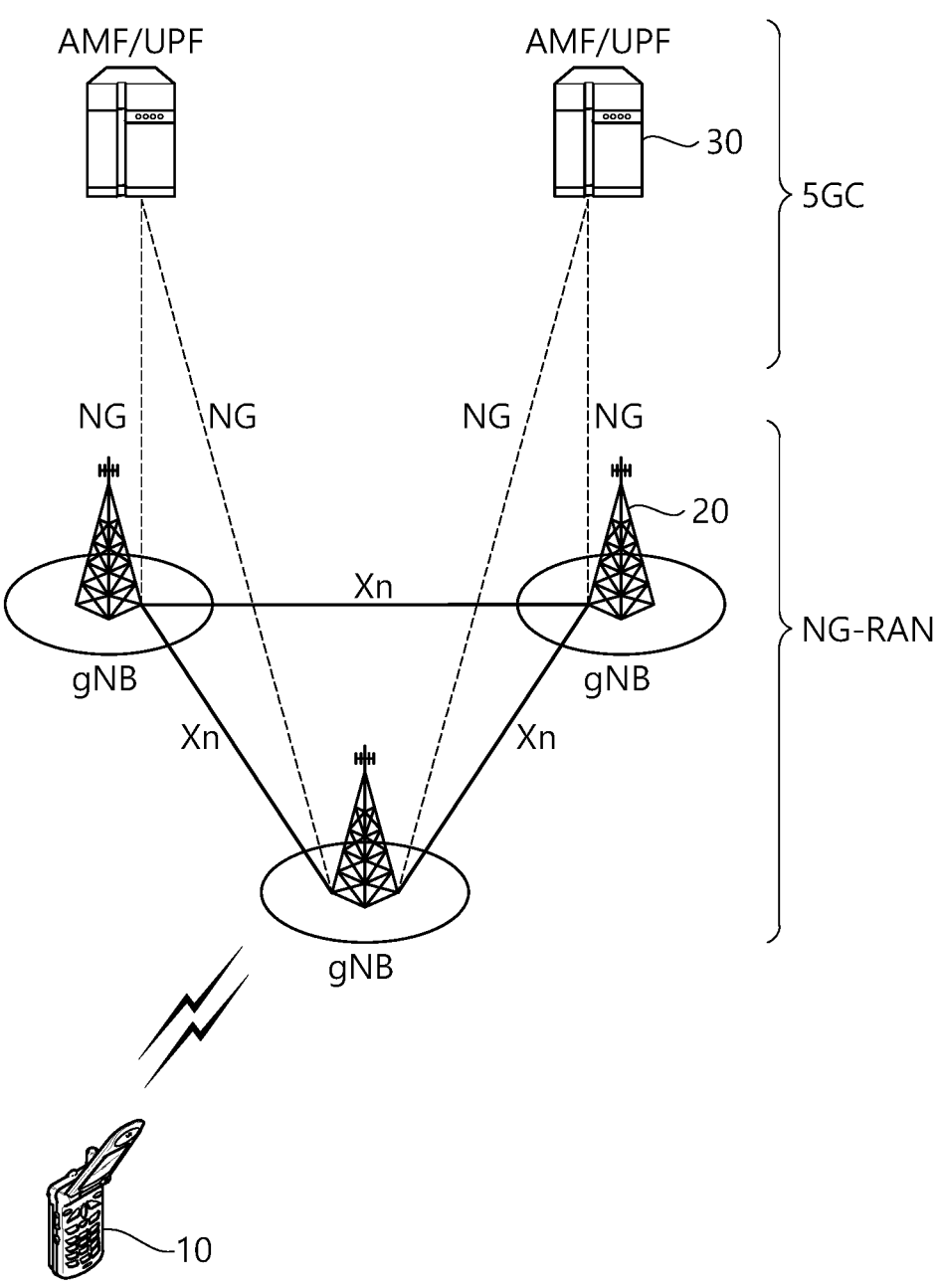

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: select a first resource within a first selection window, based on first sensing; generate a first medium access control (MAC) protocol data unit (PDU) based on at least one logical channel (LCH) in which hybrid automatic repeat request (HARQ) feedback is enabled; transmit, to a second UE, first sidelink control information (SCI) for scheduling a first physical sidelink shared channel (PSSCH), through a first physical sidelink control channel (PSCCH), based on the first resource; and transmit, to the second UE, second SCI and the first MAC PDU, through the first PSSCH, based on the first resource. For example, random selection for the first resource may be not allowed, based on HARQ feedback being enabled in the at least one LCH.

According to an embodiment of the present disclosure, a non-transitory computer-readable storage medium storing instructions may be proposed. For example, the instructions, when executed, may cause a first device to: select a first resource within a first selection window, based on first sensing; generate a first medium access control (MAC) protocol data unit (PDU) based on at least one logical channel (LCH) in which hybrid automatic repeat request (HARQ) feedback is enabled; transmit, to a second device, first sidelink control information (SCI) for scheduling a first physical sidelink shared channel (PSSCH), through a first physical sidelink control channel (PSCCH), based on the first resource; and transmit, to the second device, second SCI and the first MAC PDU, through the first PSSCH, based on the first resource. For example, random selection for the first resource may be not allowed, based on HARQ feedback being enabled in the at least one LCH.

According to an embodiment of the present disclosure, a method for performing, by a second device, wireless communication may be proposed. For example, the method may comprise: receiving, from a first device, first sidelink control information (SCI) for scheduling a first physical sidelink shared channel (PSSCH), through a first physical sidelink control channel (PSCCH); and receiving, from the first device, second SCI and a first medium access control (MAC) protocol data unit (PDU), through the first PSSCH. For example, a first resource may be selected within a first selection window, based on first sensing, the first MAC PDU may be transmitted based on the first resource. For example, the first MAC PDU may be generated based on at least one logical channel (LCH) in which hybrid automatic repeat request (HARQ) feedback is enabled. For example, random selection for the first resource may be not allowed, based on HARQ feedback being enabled in the at least one LCH.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, first sidelink control information (SCI) for scheduling a first physical sidelink shared channel (PSSCH), through a first physical sidelink control channel (PSCCH); and receive, from the first device, second SCI and a first medium access control (MAC) protocol data unit (PDU), through the first PSSCH. For example, a first resource may be selected within a first selection window, based on first sensing, the first MAC PDU may be transmitted based on the first resource. For example, the first MAC PDU may be generated based on at least one logical channel (LCH) in which hybrid automatic repeat request (HARQ) feedback is enabled. For example, random selection for the first resource may be not allowed, based on HARQ feedback being enabled in the at least one LCH.

By disallowing random selection for UEs when HARQ feedback is enabled, collisions on resources receiving HARQ feedback can be avoided.

BRIEF DESCRIPTION OF THE DRAWINGS

FIG. 1 shows a structure of an NR system, based on an embodiment of the present disclosure.

Figure 2:
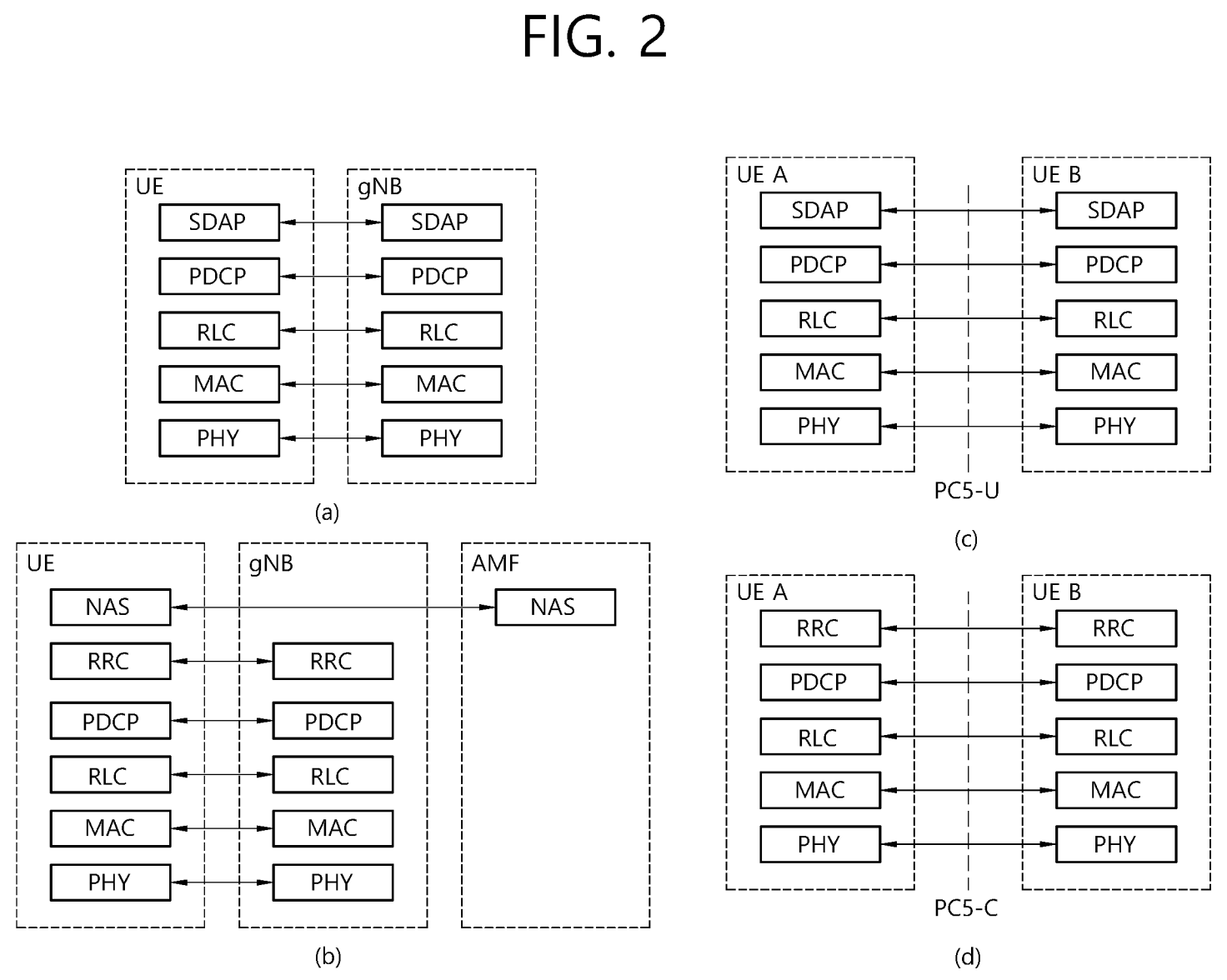

FIG. 2 shows a radio protocol architecture, based on an embodiment of the present disclosure.

Figure 3:
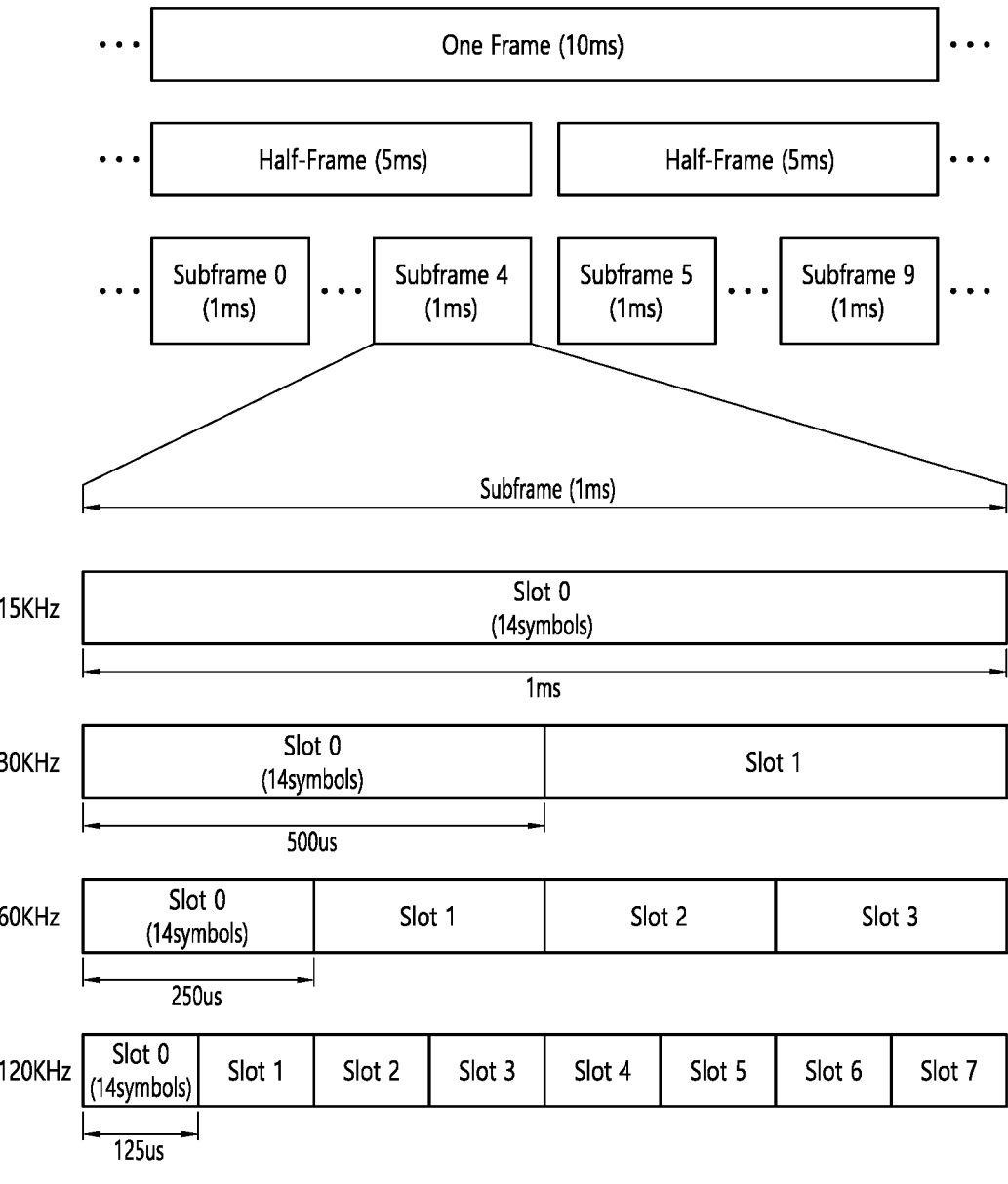

FIG. 3 shows a structure of a radio frame of an NR, based on an embodiment of the present disclosure.

Figure 4:
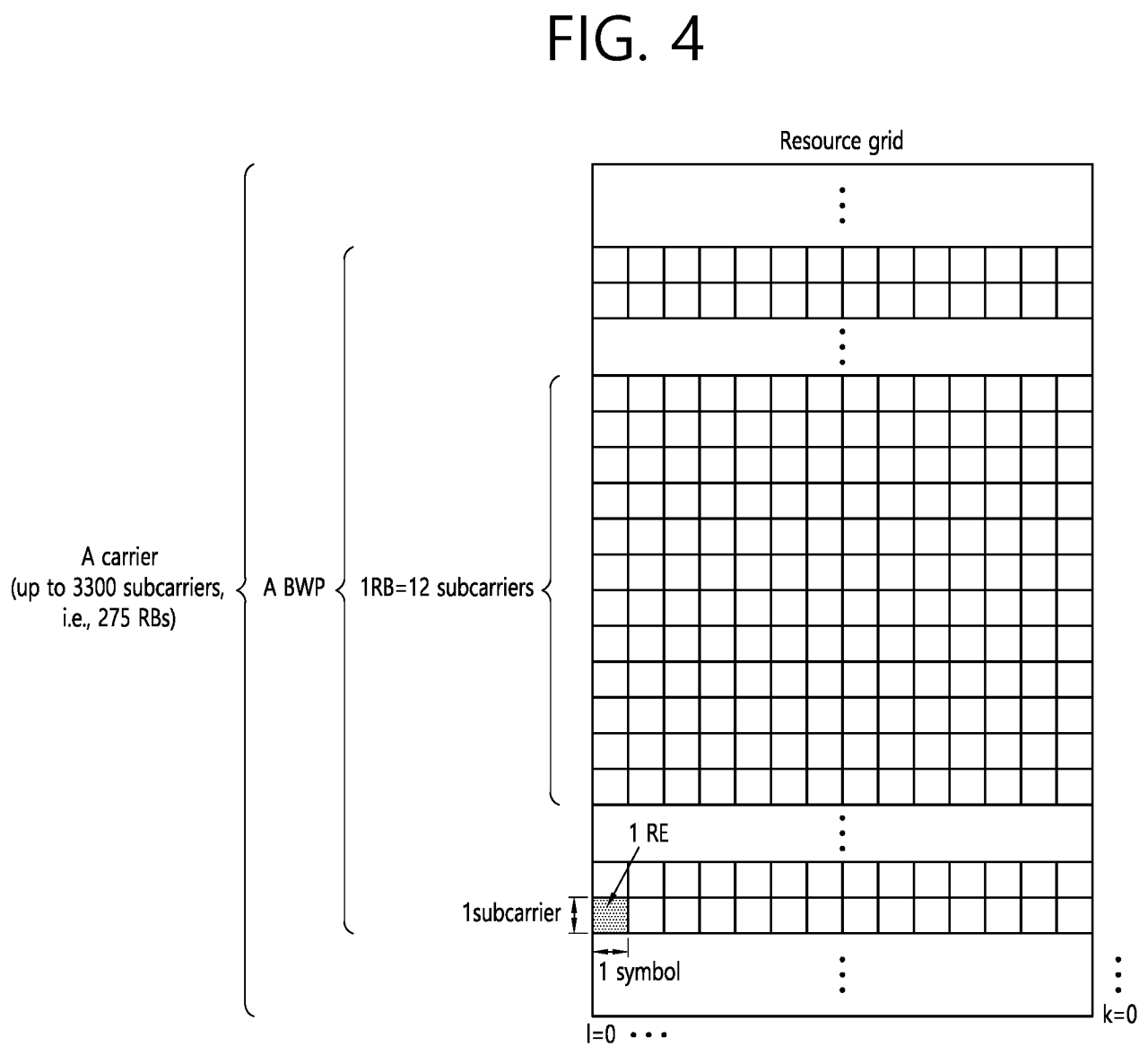

FIG. 4 shows a structure of a slot of an NR frame, based on an embodiment of the present disclosure.

Figure 5:
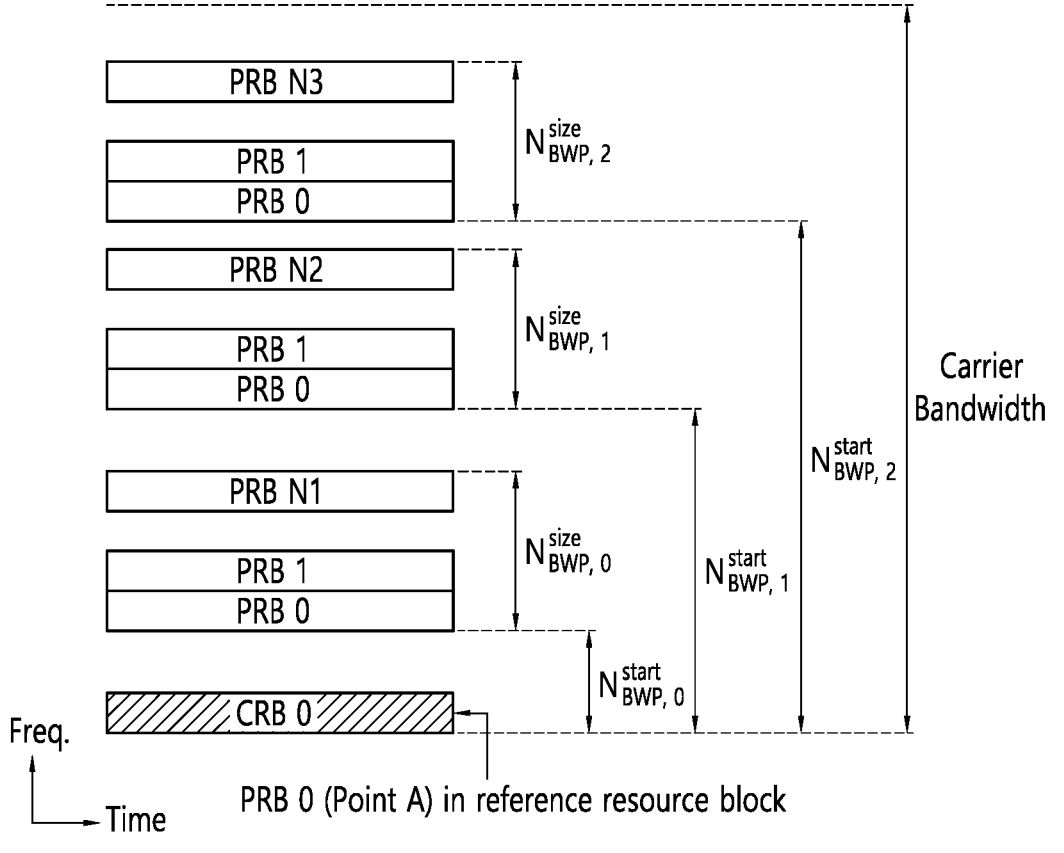

FIG. 5 shows an example of a BWP, based on an embodiment of the present disclosure.

Figure 6:
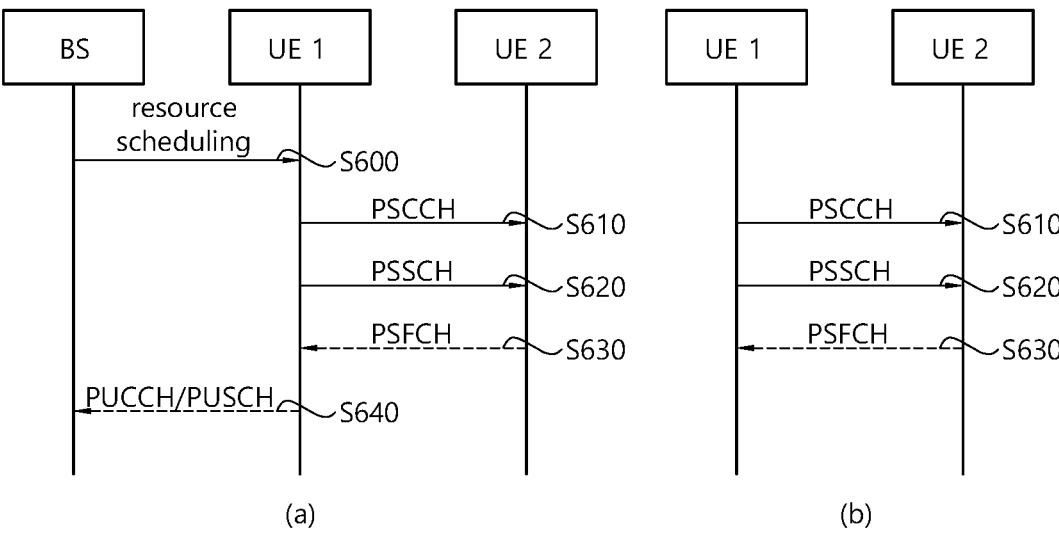

FIG. 6 shows a procedure of performing V2X or SL communication by a UE based on a transmission mode, based on an embodiment of the present disclosure.

Figure 7:
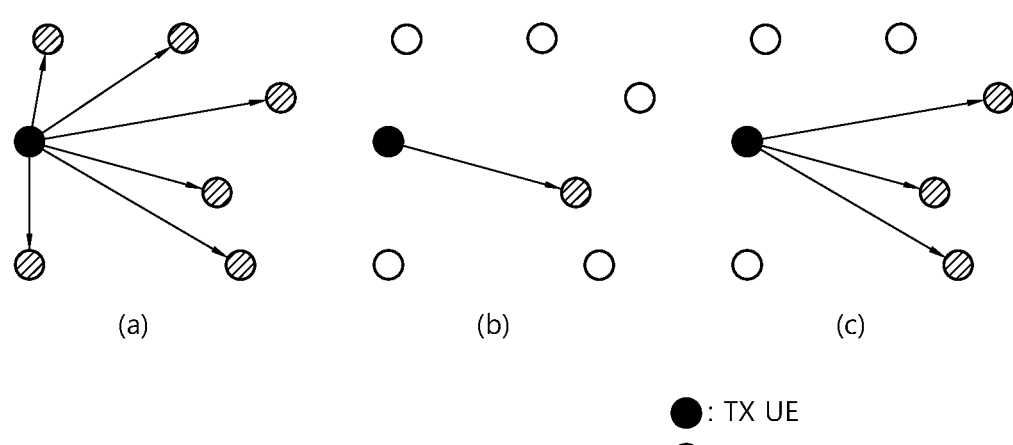

FIG. 7 shows three cast types, based on an embodiment of the present disclosure.

Figure 8:
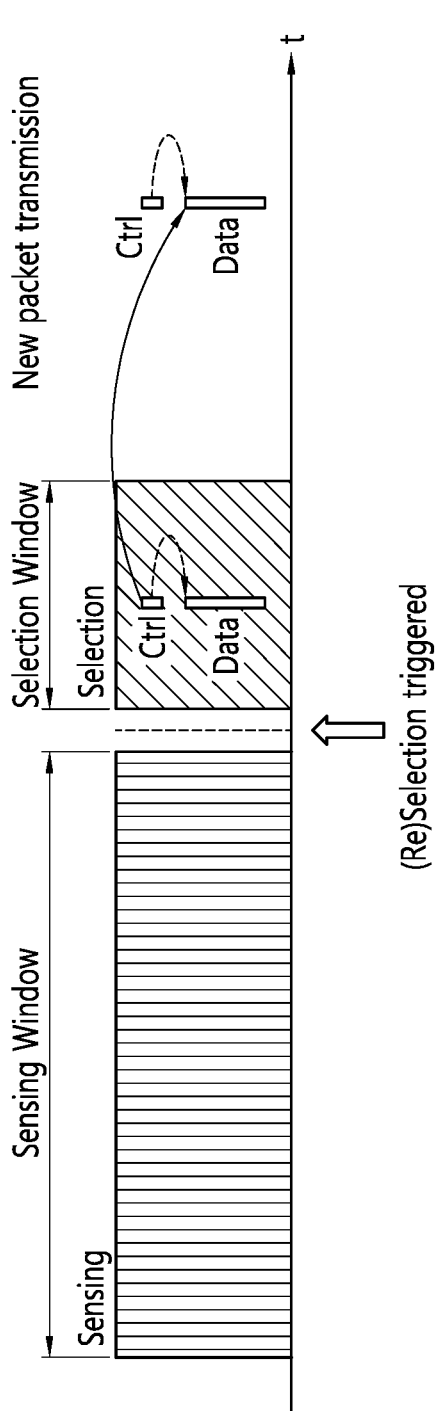

FIG. 8 shows an example of a transmission resource being selected to which the present disclosure may apply.

Figure 9:
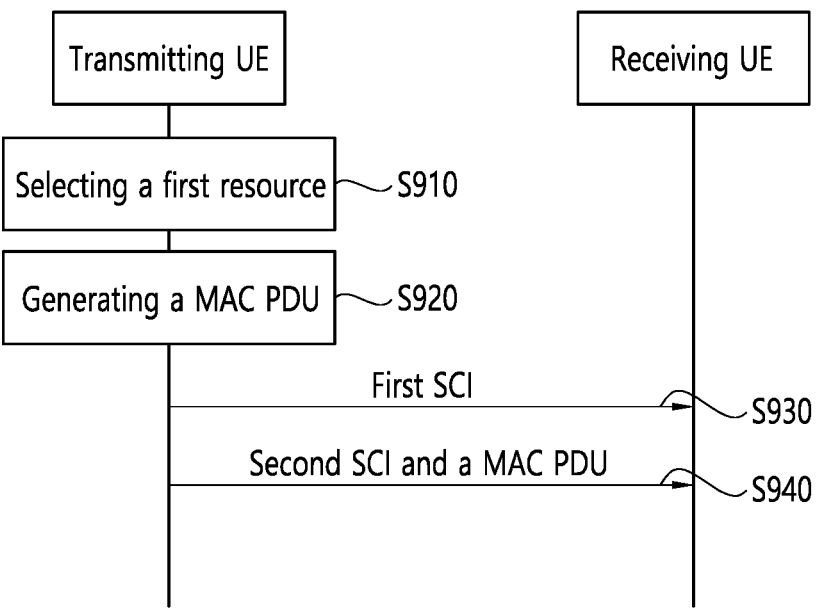

FIG. 9 shows a procedure for a transmitting UE to transmit a MAC PDU, according to one embodiment of the present disclosure.

Figure 10:
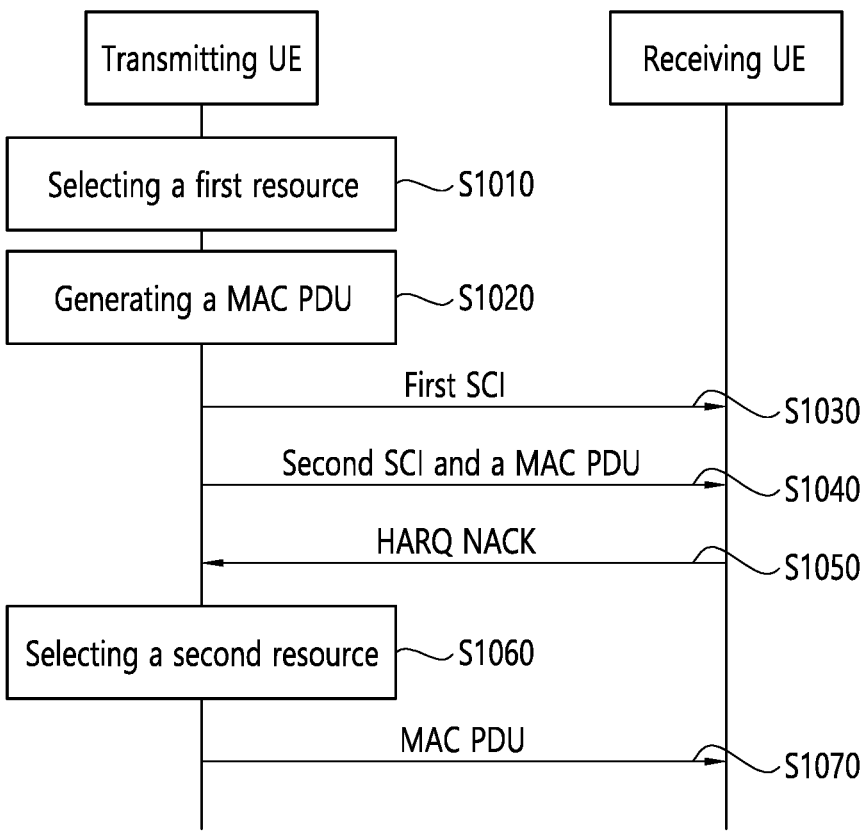

FIG. 10 shows a procedure for a transmitting UE to retransmit a MAC PDU, according to one embodiment of the present disclosure.

Figure 11:
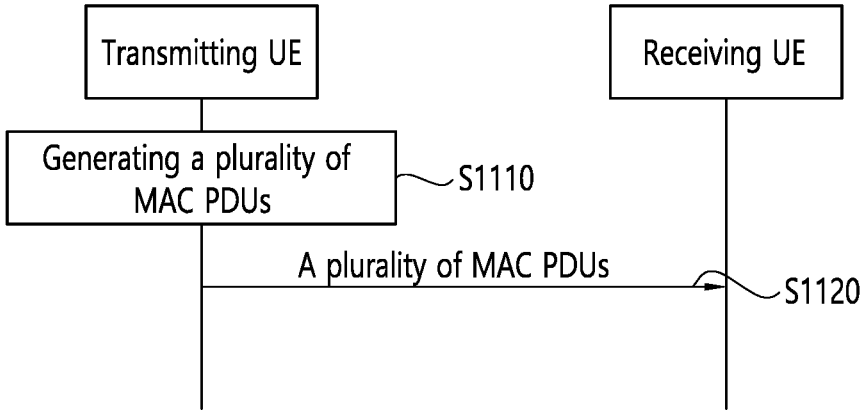

FIG. 11 shows a procedure for a transmitting UE to transmit a plurality of MAC PDUs, according to one embodiment of the present disclosure.

FIG. 12 shows a method for a first device to transmit a MAC PDU, according to one embodiment of the present disclosure.

FIG. 13 shows a method for a second device to receive a MAC PDU, according to one embodiment of the present disclosure.

Figure 14:
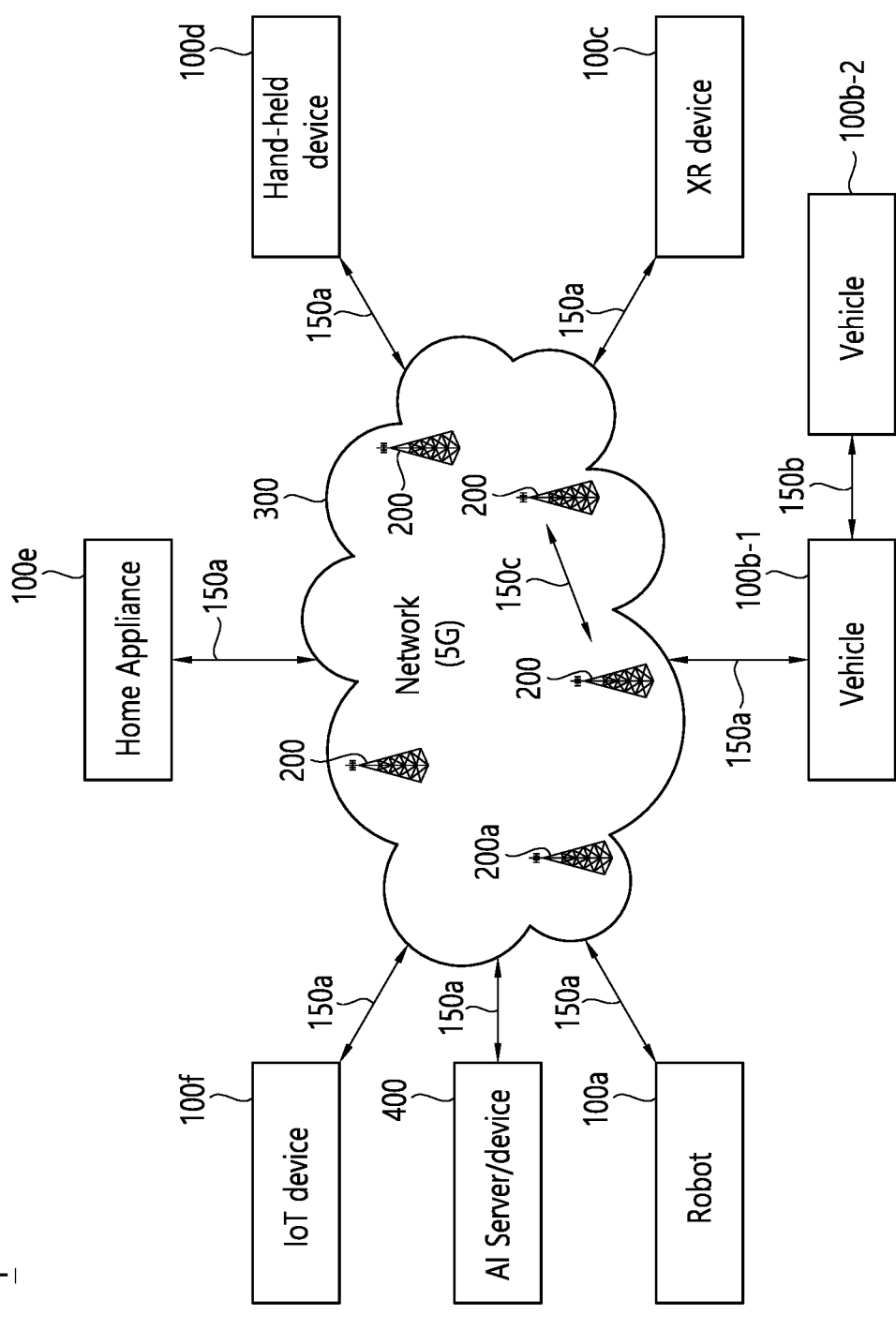

FIG. 14 shows a communication system 1, based on an embodiment of the present disclosure.

Figure 15:
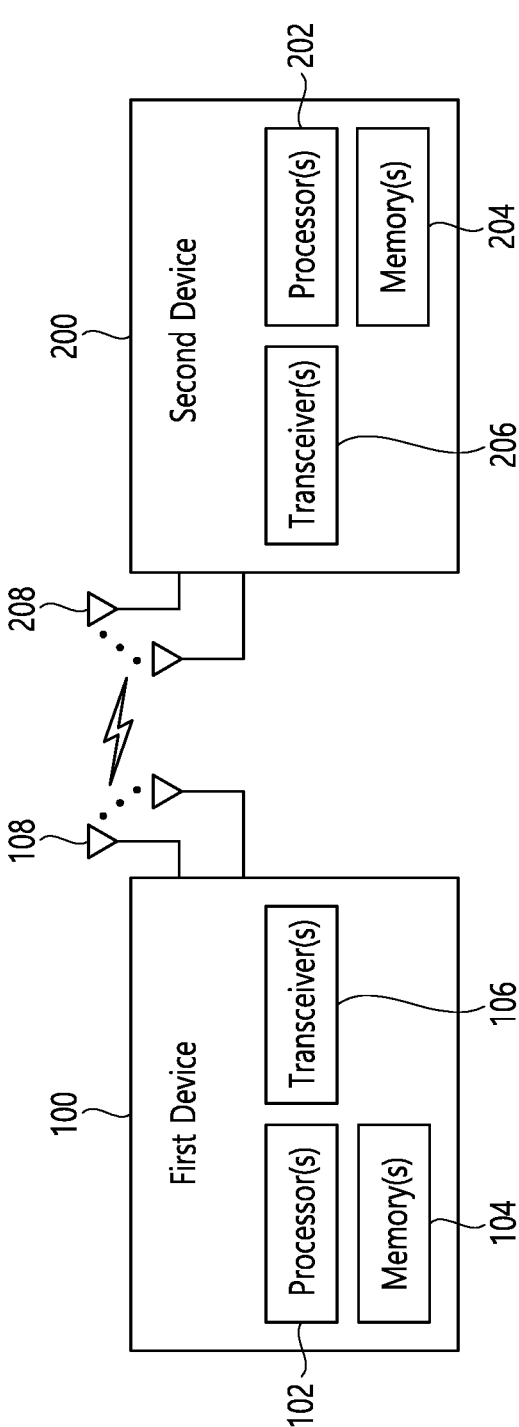

FIG. 15 shows wireless devices, based on an embodiment of the present disclosure.

Figure 16:
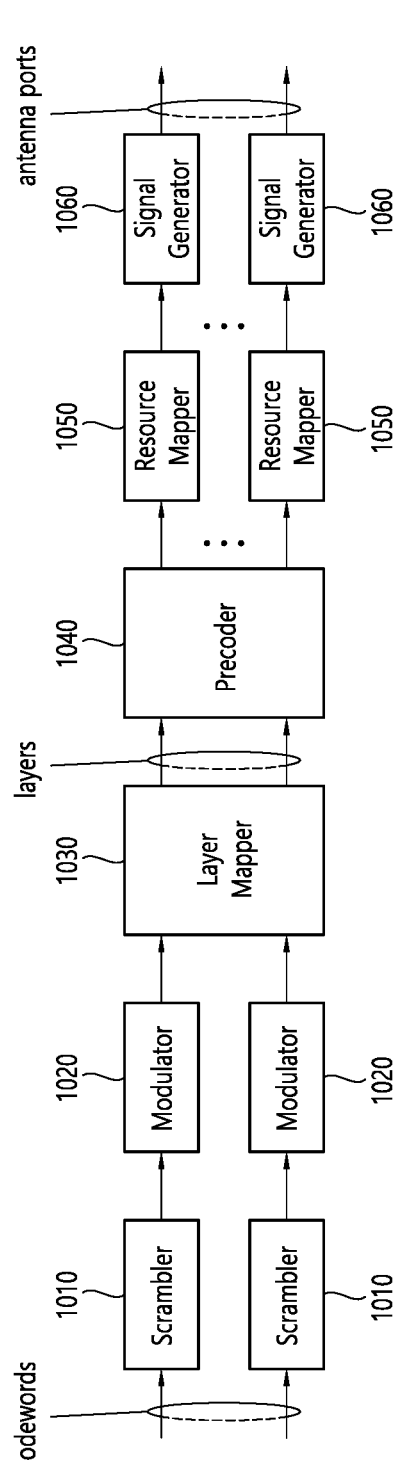

FIG. 16 shows a signal process circuit for a transmission signal, based on an embodiment of the present disclosure.

FIG. 17 shows another example of a wireless device, based on an embodiment of the present disclosure.

Figure 18:
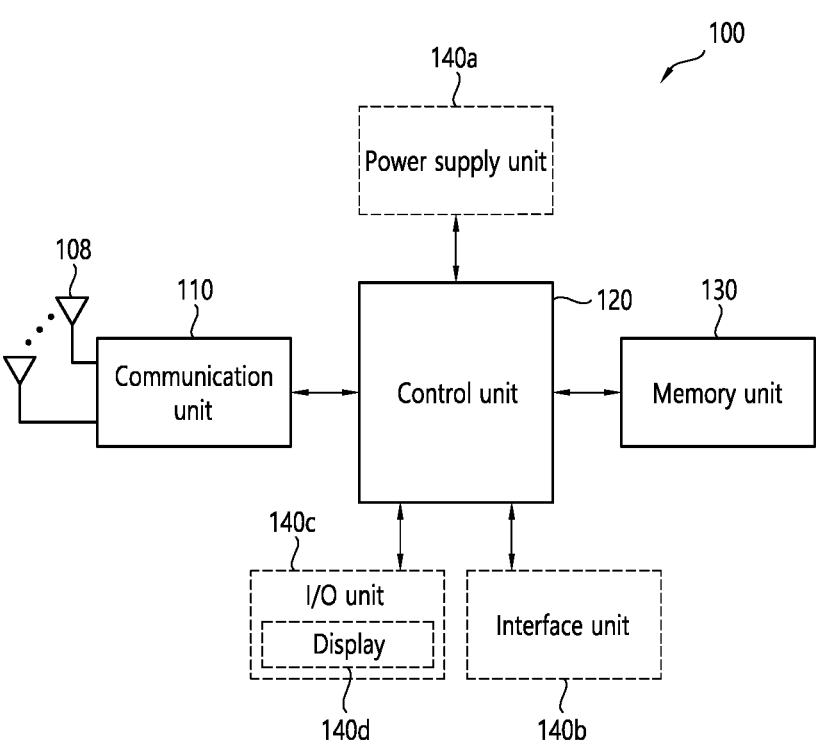

FIG. 18 shows a hand-held device, based on an embodiment of the present disclosure.

FIG. 19 shows a vehicle or an autonomous vehicle, based on an embodiment of the present disclosure.

DETAILED DESCRIPTION

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and pro-vides backward compatibility with a system based on the IEEE 802.16e. The UTRA is part of a universal mobile telecommunication system (UMTS). 3rd generation partner-ship project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A correspond-ing to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclo-sure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access net-work (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be con-nected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system inter-connection (OSI) model that is well-known in the commu-nication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified accord-ing to how and with what characteristics data is transmitted through a radio interface.

Between different physical layers, i.e., a physical layer of a transmitter and a physical layer of a receiver, data are transferred through the physical channel. The physical chan-nel is modulated using an orthogonal frequency division multiplexing (OFDM) scheme, and utilizes time and fre-quency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHZ | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHZ | 60, 120, 240 kHz |

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SS S. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI Resource pool index—ceiling ($\log_2$ I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits.

New data indicator—1 bit.

Lowest index of the subchannel allocation to the initial transmission—ceiling ($\log_2(N^{SL}_{subChannel})$) bits SCI format 1—A field: Frequency resource assignment, Time resource assignment PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH, PUCCH resource indicator—3 bits Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HAR Q-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2(N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described. SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described. SCI format 2-B is used for the decoding of PSSCH, with HARQ operation when HARQ-ACK information includes only NACK, or when there is no feedback of HARQ-ACK information.

In HARQ operation, if the HARQ-ACK information contains only a NACK, or if there is no feedback from the HARQ-ACK information, SCI format 2-B is used to decode the PSSCH.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource. Referring to (a) of FIG. 6, in step S640, the first UE may transmit SL HARQ feedback to the base station through the PUCCH and/or the PUSCH.

Hereinafter, a UE procedure for reporting HARQ-ACK in the sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ ($0 \le k < T'_{max}$) has a PSFCH transmission occasion resource if k mod $N^{PSFCH}_{PSSCH}=0$, where $t'^{SL}_k$ is a slot that belongs to the resource pool, $T'_{max}$ is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i+j \cdot N^{PSFCH}_{PSSCH}) \cdot M^{PSFCH}_{subch,slot}, (i+1+j \cdot N^{PSFCH}_{PSSCH}) \cdot M^{PSFCH}_{subch,slot}-1]$ PRBs from the $M^{PSFCH}_{PRB,set}$ PRBs to slot i among the PSSCH slots associated with the PSFCH slot and subchannel j, where $M^{PSFCH}_{subch,slot}=M^{PSFCH}_{PRB,set}/(N_{subch} \cdot N^{PSFCH}_{PSSCH})$, $0 \le i < N^{PSFCH}_{PSSCH}$, $0 \le j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$.

A UE determines a number of PSFCH resources available for multiplexing HARQ-ACK information in a PSFCH transmission as $R^{PSFCH}_{PRB,CS}=N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers, $N^{PSFCH}_{type}=1$ and the $M^{PSFCH}_{subch,slot}$ PRBs are associated with the starting sub-channel of the corresponding PSSCH $N^{PSFCH}_{type}=N^{PSSCH}_{subch}$ and the $N^{PSSCH}_{subch} \cdot M^{PSFCH}_{subch,slot}$ PRBs are associated with one or more sub-channels from the $N^{PSSCH}_{subch}$ sub-channels of the corresponding PSSCH The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID})$ mod $R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift $\alpha$, from a cyclic shift pair index corresponding to a PSFCH resource index and from $N^{PSFCH}_{CS}$ using Table 8.

TABLE 8

| | $m_0$ | | | | | |
|---|---|---|---|---|---|---|
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a m cs value, for computing a value of cyclic shift $\alpha$, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

FIG. 7 shows three cast types, in accordance with an embodiment of the present disclosure. The embodiment of FIG. 7 may be combined with various embodiments of the present disclosure. Specifically, FIG. 7(*a*) shows broadcast-type SL communication, FIG. 7(*b*) shows unicast type-SL communication, and FIG. 7(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, SL congestion control (sidelink congestion control) will be described.

For example, a UE may determine whether energy measured in a unit time/frequency resource is equal to or greater than a predetermined level, and the UE may adjust the amount and frequency of its own transmission resources according to the ratio of unit time/frequency resources in which energy of a certain level or higher is observed. In the present specification, a ratio of time/frequency resources in which energy of a certain level or higher is observed may be defined as a channel busy ratio (CBR). A UE may measure the CBR for each channel/frequency. Additionally, a UE may transmit the measured CBR to a network/base station.

CBR may mean the number of subchannels for which the RSSI measurement result value is equal to or greater than a pre-configured threshold, as a result of the UE measuring Received Signal Strength Indicator (RSSI) in units of sub-channels for a specific period (e.g., 100 ms). Alternatively, CBR may mean a ratio of subchannels having a value equal to or greater than a pre-configured threshold among sub-channels during a specific period.

For example, when a PSCCH and a PSSCH are multi-plexed in the frequency domain, a UE can perform one CBR measurement for one resource pool. Here, if a PSFCH resource is configured or previously configured, the PSFCH resource may be excluded from the CBR measurement.

Furthermore, congestion control considering the priority of traffic (e.g., packets) may be required. To this end, for example, a UE may measure channel occupancy ratio (CR). Specifically, a UE measures the CBR, and may determine the maximum value (CRlimitk) of the channel occupancy ratio (Channel Occupancy Ratio k, CRk) that traffic corresponding to each priority (e.g., k) can occupy according to the CBR. For example, a UE may derive the maximum value (CRlimitk) of the channel occupancy for the priority of each traffic based on a predetermined table of CBR measurement values. For example, in the case of traffic having a relatively high priority, a UE may derive a maximum value of a relatively large channel occupancy. Thereafter, a UE may perform congestion control by limiting the sum of channel occupancy rates of traffics whose priority k is lower than i to a predetermined value or less. According to this method, a stronger channel occupancy limit may be applied to traffic having a relatively lower priority.

In addition, a UE may perform SL congestion control using methods such as transmission power size adjustment, packet drop, retransmission decision, transmission RB size adjustment (MCS adjustment), and the like.

Table 11 shows an example of SL CBR and SL RSSI.

TABLE 11

| SL CBR |
| --- |

| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n-a, n-1], wherein a is equal to 100 or $100 \cdot 2^{\mu}$ slots, according to higher layer parameter timeWindowSize-CBR. |
| Applicable for | RRC_IDLE intra-frequency, RRC_IDLE inter-frequency, RRC_CONNECTED intra-frequency, RRC_CONNECTED inter-frequency |

| SL RSSI |
| --- |

| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the $2^{nd}$ OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency, RRC_IDLE inter-frequency, RRC_CONNECTED intra-frequency, RRC_CONNECTED inter-frequency |

Referring to Table 11, a slot index can be based on a physical slot index.

FIG. 8 shows an example of a transmission resource being selected to which the present disclosure may apply.

In V2X communication, two transmissions may be made per MAC PDU. For example, referring to FIG. 14, when selecting a resource for the initial transmission, a resource for a retransmission may be reserved with a certain time gap. Within a sensing window, a UE may sense to determine which transmission resources are reserved by other UEs or which resources are in use by other UEs, and may exclude these and randomly select a resource from the remaining resources with the least interference.

For example, within the sensing window, the device may decode a PSCCH including information regarding the periodicity of the reserved resources and measure the PSSCH RSRP on the periodically determined resources based on the PSCCH. A UE may exclude resources whose PSSCH RSRP value exceeds a threshold from a selection window. Thereafter, the UE may randomly select a sidelink resource from the remaining resources in the selection window.

Alternatively, a device may measure the Received signal strength indication (RSSI) of the periodic resources within the sensing window to determine resources with less interference (e.g., in the bottom 20%). And, the device may randomly select a sidelink resource from among the periodic resources included in the selection window. For example, if a UE fails to decode a PSCCH, the UE may use the above method.

For example, an SL DRX configuration may include one or more of the information listed below.

For example, SL drx-onDurationTimer may be information regarding the duration at the beginning of a DRX Cycle. For example, the duration at the beginning of a DRX Cycle may be information regarding the duration during which a UE is operating in active mode to transmit or receive sidelink data.

For example, SL drx-SlotOffset may be information regarding the delay before starting a drx-onDurationTimer.

For example, SL drx-ShortCycle may be information regarding the Short DRX cycle. For example, SL drx-ShortCycle may be optional information.

For example, SL drx-ShortCycleTimer may be information regarding the duration the UE shall follow the Short DRX cycle. For example, SL drx-ShortCycleTimer may be optional information.

For example, SL drx-HARQ-RTT-Timer may be information regarding the minimum duration before an assignment for HARQ retransmission is expected by the MAC entity. For example, the SL drx-HARQ-RTT-Timer may be configured per HARQ process.

On the other hand, NR V2X in release 16 did not support power saving operation of user equipment (UE), and NR V2X in release 17 may support power saving operation of UEs (e.g., power saving UEs).

For example, a UE may perform sidelink DRX operation based on a sidelink (SL) discontinuous reception (DRX) pattern (e.g., DRX Cycle, DRX On-duration, DRX Off-duration) to perform power saving operation. For example, for SL DRX operation, an SL DRX Configuration (e.g., SL DRX Cycle, SL DRX On-duration, SL DRX Off-duration, timer to support SL DRX operation, etc.) to be used by a Power Saving UE (P-UE) needs to be defined. In addition, an operation of a transmitting and receiving UE needs to be defined in an on-duration (the period during which sidelink reception/transmission can be performed) and off-duration (the period during which they operate in sleep mode). In the following description, "when, if", in case of may be replaced by "based on". In the following description, the names of the timers (Uu DRX HARQ RTT TimerSL, Uu DRX Retransmission TimerSL, etc.) are exemplary, and timers that perform the same/similar functions based on the contents described in each timer can be considered the same/similar timers regardless of their names.

On the other hand, in LTE V2X in Release 14, when configuring a pool for a P2X UE, whether it is random selection or partial sensing may be always configured, as shown in Table 12 below.

TABLE 12

| SL-P2X-ResourceSelectionConfig-r14 ::= | | SEQUENCE { | |
|---|---|---|---|
| partialSensing-r14 | ENUMERATED {true} | OPTIONAL, | -- Need OR |
| randomSelection-r14 | ENUMERATED {true} | OPTIONAL | -- Need OR |

For example, SL drx-InactivityTimer may be information regarding the duration after the PSCCH occasion in which a PSCCH indicates a new sidelink transmission and sidelink reception for the MAC entity. For example, if a transmitting UE is indicated to transmit of a PSSCH via a PSCCH, the transmitting UE may transmit the PSSCH to a receiving UE by operating in active mode while the SL drx-Inactivity-Timer is operating. Further, for example, if a receiving UE is indicated to transmit a PSSCH by the transmitting UE through the receipt of a PSCCH, the receiving UE may receive the PSSCH from the transmitting UE by operating in the active mode while the SL drx-InactivityTimer is operating.

For example, SL drx-RetransmissionTimer may be information regarding the maximum duration until a retransmission is received. For example, the SL drx-Retransmission Timer may be configured per HARQ process.

For example, SL drx-LongCycleStartOffset may be information regarding the Long DRX cycle and drx-StartOffset which defines the subframe where the Long and Short DRX Cycle starts.

For example, an LTE V2X operation of Release 14 may be applied in NR. In this case, if a UE performs random selection or partial sensing, a parameter related to enabling SL HARQ feedback (e.g., sl-HARQ-FeedbackEnabled) is enabled and a PSFCH is configured, the UE may perform SL HARQ feedback operation. For example, if a UE performs a random selection, there may be no sensing result, so the UE may have a problem with retransmission judgment in case of a collision when receiving an ACK/NACK based on the PSFCH resource.

According to one embodiment of the present disclosure, when a logical channel is configured, partial sensing or random selection may be configured for each logical channel or logical channel group.

Alternatively, for example, if a logical channel is configured, partial sensing or random selection may be configured for a logical channel on per service indicated downward from the V2X layer.

According to one embodiment of the present disclosure, when performing logical channel prioritization (LCP), a UE may perform LCP only with logical channels configured based on partial sensing.

Or, for example, when performing LCP, a UE can only perform LCP on logical channels that are configured based on random selection.

This allows a UE to disable parameters (e.g., sl-HARQ-Feedback) related to whether SL HARQ feedback is enabled or not, considering collides with other resources, for logical channels for which random selection was performed. In other words, by configuring LCP only with logical channels selected through partial sensing, a UE may be able to perform prioritization, compared to resource selection based on random selection.

According to one embodiment of the present disclosure, when a parameter related to an LCH is configured, only "partial sensing" may be allowed/configured for that LCH for an LCH set to "HARQ feedback enabled". Here, for example, the parameter related to the LCH may include at least one of a parameter related to whether HARQ feedback is enabled, a parameter related to partial sensing, a parameter related to random selection, or a parameter related to SL priority.

For example, only "partial sensing" may be allowed/configured, based on at least one of a case of an LCH configured to "HARQ feedback enabled", a case with a higher priority than the pre-configured priority, a case involving a service with tight requirements (e.g., latency, reliability), a case where the CBR measurement of a resource pool related to the LCH is greater than a pre-configured threshold, or a case where the amount of remaining battery in a UE is greater than a pre-configured threshold.

This means that, for example, if an LCH for which HARQ feedback is enabled has a higher priority than a pre-configured priority, only partial sensing may be allowed/enabled for the LCH. For example, if an LCH for which HARQ feedback is enabled is related to a service with tight requirements (e.g., latency, reliability), only partial sensing may be allowed/enabled for the LCH. For example, if an LCH with HARQ feedback enabled has a CBR measurement value of the resource pool related to the LCH that is greater than a pre-configured threshold, only partial sensing may be allowed/enabled for the LCH. For example, if the amount of remaining battery of a UE related to an LCH for which HARQ feedback is enabled is greater than a pre-configured threshold, only partial sensing may be allowed/enabled for the LCH.

For example, if a parameter related to an LCH is configured, random selection may be configured for the LCH configured to "HARQ feedback disabled". Here, for example, the parameter related to the LCH may include at least one of a parameter related to whether HARQ feedback is enabled, a parameter related to partial sensing, a parameter related to random selection, or a parameter related to SL priority.

For example, "random selection" may be allowed/configured for ant LCH based on at least one of a case when an LCH configured to "HARQ feedback disabled" has a lower priority than the pre-configured priority, a case involving services with loose requirements (e.g., latency, reliability), a case where the CBR measurement of a resource pool related to the LCH is less than a pre-configured threshold, or a case when the amount of remaining battery in the UE is less than a pre-configured threshold.

For example, partial sensing and random selection may be configured for an LCH configured to "HARQ feedback disabled" when parameters related to LCH are configured. For example, partial sensing and random selection may be allowed/enabled for an LCH configured to "HARQ feedback disabled" based on at least one of the following: a case when an LCH has a lower priority than a pre-configured priority, a case when the LCH is related to a service with loose requirements (e.g., latency, reliability), a case when the CBR measurement value of a resource pool related to the LCH is less than a pre-configured threshold, or a case when the amount of remaining battery in the UE is less than a pre-configured threshold. Here, for example, if "partial sensing and random selection" is configured, which of the two is selected/applied by a UE may be implementation-defined. For example, when "partial sensing and random selection" is configured, a UE may perform "partial sensing" based on at least one of the following: a case when an LCH has a higher priority than a pre-configured priority, a case when the LCH is related to a service with tight requirements (e.g., latency, reliability), a case when an LCH has a CBR measurement value of a resource pool related to the LCH greater than a pre-configured threshold, or a case when an amount of remaining battery in the UE greater than a pre-configured threshold.

According to one embodiment of the present disclosure, when generating a MAC PDU based on LCP operation, for example, data of the same destination ID and/or data of the same cast type may be multiplexed into the same MAC PDU despite having different resource selection types. Here, for example, the resource selection type may include partial sensing and random selection. Here, for example, the data may be data related to an SL LCH, i.e., may be in a form that reuses the operation of Release-16. For example, for transmission of a multiplexed MAC PDU, a resource selection type related to the highest priority SL LCH on the MAC PDU may be applied. Here, for example, the resource selection type related to the SL LCH may be a resource selection type related to SL LCH data. Alternatively, for example, for the transmission of multiplexed MAC PDUs, a pre-configured resource selection type may be applied. For example, for the transmission of multiplexed MAC PDU, partial sensing operation may always be applied. For example, for the transmission of multiplexed MAC PDU, random selection operation may always be applied.

Here, for example, if there are multiple highest priority SL LCHs and resource selection types related to the LCHs are different, a partial sensing operation may be applied. For example, if there is more than one highest priority SL LCH and the resource selection types related to the LCHs are different, a random selection operation may be applied. For example, if there are multiple highest priority SL LCHs and resource selection types related to the LCHs are different, the resource selection type may be determined by UE implementation. For example, if there are multiple highest priority SL LCHs and resource selection types related to the LCHs are different, the resource selection type related to the LCHs for data with a relatively small remaining packet delay budget (PDB) value may be applied. For example, if there are multiple highest priority SL LCHs and the resource selection types related to the LCHs are different, the resource selection type related to the LCHs for data with a relatively long minimum required communication distance may be applied.

Alternatively, for example, in terms of LCP operation, data of the same resource selection type may be multiplexed into the same MAC PDU if data of the same destination ID and/or data of the same cast type are present. Here, the data may be data related to an SL LCH, i.e., for example, despite the presence of data of the same destination ID and/or data of the same cast type, different resource selection types may generate separate or independent MAC PDUs.

Here, for example, in applying the embodiments described above, LCH data with HARQ feedback enabled and LCH data with HARQ feedback disabled may not be multiplexed into the same MAC PDU.

Here, for example, in applying the above embodiments, in the LCP operation, for SL LCHs with the same priority, an SL LCH with partial sensing configured may be reflected first to the MAC PDU, i.e., an LCH with partial sensing configured may be determined to have a relatively higher priority. Alternatively, for example, when applying the embodiment described above, in the LCP operation, for SL LCHs with the same priority, an SL LCH with the random selection configured may be preferentially reflected in the MAC PDU, i.e., an SL LCH with the random selection configured may be determined to have a relatively higher priority.

According to one embodiment of the present disclosure, a UE may perform a partial sensing operation to select a transmission resource related to an LCH, if partial sensing operation is configured to at least one of the LCHs mapped to the SL grant. For example, a UE may perform a partial sensing operation to select a transmission resource related to an LCH, if partial sensing operation is configured to the LCH with the highest priority among LCHs mapped to the SL grant. Here, for example, the SL grant may include a selected SL grant. For example, a UE may perform a partial sensing operation to select a transmission resource related to an LCH, if partial sensing operation is configured to at least one LCH among the LCHs mapped to an SL process. For example, a UE may perform a partial sensing operation to select a transmission resource related to an LCH, if partial sensing operation is configured to the LCH with the highest priority among the LCHs mapped to an SL process.

For example, a UE may perform a partial sensing operation to select a transmission resource related to an LCH, if partial sensing operation is configured to at least one LCH among at least one LCH for which data is available among the LCHs mapped to an SL grant. For example, a UE may perform a partial sensing operation to select a transmission resource related to an LCH, if partial sensing operation is configured to the LCH with the highest priority among at least one LCH for which data is available, among the LCHs mapped to an SL grant. For example, the SL grant may include the selected SL grant.

For example, a UE may perform a partial sensing operation to select a transmission resource related to an LCH, if partial sensing operation is configured to at least one LCH among at least one LCH for which data is available, among the LCHs mapped to an SL process. For example, a UE may perform a partial sensing operation to select a transmission resource related to an LCH, if partial sensing operation is configured to the LCH with the highest priority among at least one LCH for which data is available, among the LCHs mapped to an SL process.

For example, a UE may perform a partial sensing operation to select a transmission resource related to a service, if partial sensing operation is configured to at least one service among the services of interest to the UE. For example, a UE may perform a partial sensing operation to select a transmission resource related to a service, if partial sensing operation is configured to the service with the highest service, among the services of interest to the UE.

According to one embodiment of the present disclosure, data of the same destination ID and/or data of the same cast type may be multiplexed into the same MAC PDU if SL DRX is applied and/or parameters related to SL DRX are specified differently. Here, for example, the data may be data related to an SL LCH, i.e., for example, reusing the operation of Release 16. For example, to transmit the same multiplexed MAC PDU, whether to apply SL DRX related to the SL LCH of the highest priority and/or a parameters related to SL DRX may be considered. For example, the MAC PDU may be transmitted based on whether SL DRX related to the SL LCH of the highest priority on the MAC PDU is applied and/or a parameter related to SL DRX. Here, for example, the SL LCH may be data related to the SL LCH.

Alternatively, for example, to transmit the same multiplexed MAC PDU, the pre-configured SL DRX may be applied and/or parameters related to the SL DRX may be considered. For example, to transmit identical multiplexed MAC PDUs, the pre-configured SL DRX may not be applied and/or parameters related to the SL DRX may not be considered. For example, the MAC PDU may be transmitted based on whether a pre-configured SL DRX is applied and/or the parameter related to the SL DRX.

Alternatively, for example, in terms of LCP operation, when data of the same destination ID and/or data of the same cast type are present, only data in which whether to apply SL DRX and/or parameters related to SL DRX are the same may be multiplexed into the same MAC PDU. Here, for example, the data may include data related to an SL LCH. For example, even for data with the same destination ID and/or the same cast type, in case of data in which whether to apply SL DRX and/or parameters related to SL DRX are different, a UE may generate an independent of separate MAC PDU with the data.

Here, for example, if there are multiple highest priority SL LCHs, the SL DRX operation may be applied if whether to apply SL DRX and/or parameters related to SL DRX are different with respect to the multiple SL LCHs. Here, for example, the SL LCH may include data related to the SL LCH. For example, if there are multiple highest priority SL LCHs, the UE may implementatively determine whether to apply SL DRX and/or parameters related to SL DRX, if whether to apply SL DRX and/or parameters related to SL DRX related to the multiple SL LCHs are different. For example, if there are multiple highest priority SL LCHs, and if whether to apply SL DRX and/or parameters related to SL DRX related to the multiple SL LCHs are different, a UE may follow whether to apply SL DRX and/or parameters related to SL DRX related to the LCH of data whose remaining PDB value is relatively small. For example, when there are multiple SL LCHs with the highest priority, if whether to apply SL DRX and/or parameters related to SL DRX related to the multiple SL LCHs are different, a UE may follow whether to apply SL DRX and/or parameters related to SL DRX related to the LCH of data with a relatively long minimum required communication distance.

Here, for example, in applying the embodiments described above, LCH data with HARQ feedback enabled and LCH data with HARQ feedback disabled may not be multiplexed into the same MAC PDU.

Here, for example, in applying the above embodiments, in LCP operation, for SL LCHs with the same priority, the SL LCH with SL DRX operation configured may be preferentially reflected in a MAC PDU, i.e., the SL LCH with SL DRX operation enabled may be determined to have a relatively higher priority. Alternatively, for example, in applying the above embodiment, in LCP operation, for SL LCHs with the same priority, the SL LCH with SL DRX operation not configured may be preferentially reflected in a MAC PDU, that is, the SL LCH for which an SL DRX operation is not configured may be determined to have a relatively higher priority.

According to one embodiment of the present disclosure, the same logical channel group (LCG) ID may not be configured for LCHs with different resource selection types enabled or allowed, i.e., a UE may not expect the same LCG ID for LCHs with different resource selection types enabled or allowed.

For example, partial sensing may be specifically or differently configured or allowed for at least one of service type, priority, requirement, HARQ feedback enabled, HARQ feedback disabled, LCH/MAC PDU, resource pool CBR measurement value, SL cast type (e.g., unicast, groupcast, broadcast), SL groupcast HARQ feedback options (e.g., NACK only feedback, ACK/NACK feedback, TX-RX distance based NACK only feedback), SL mode 1 CG type (e.g., SL CG type 1/2), etc. element/parameter. For example, a random selection may be specifically or differently configured or allowed for at least one of service type, priority, requirement, HARQ feedback enabled, HARQ feedback disabled, LCH/MAC PDU, resource pool CBR measurement value, SL cast type (e.g., unicast, groupcast, broadcast), SL groupcast HARQ feedback options (e.g., NACK only feedback, ACK/NACK feedback, TX-RX distance based NACK only feedback), SL mode 1 CG type (e.g., SL CG type 1/2), etc. element/parameter. For example, partial sensing and random selection may be specifically or differently configured or allowed for at least one of service type, priority, requirement, HARQ feedback enabled, HARQ feedback disabled, LCH/MAC PDU, resource pool CBR measurement value, SL cast type (e.g., unicast, groupcast, broadcast), SL groupcast HARQ feedback options (e.g., NACK only feedback, ACK/NACK feedback, TX-RX distance based NACK only feedback), SL mode 1 CG type (e.g., SL CG type 1/2), etc. element/parameter.

For example, various embodiments of the present disclosure may be specifically or differently configured or allowed for at least one of service type, priority, requirement, HARQ feedback enabled, HARQ feedback disabled, LCH/MAC PDU, resource pool CBR measurement value, SL cast type (e.g., unicast, groupcast, broadcast), SL groupcast HARQ feedback options (e.g., NACK only feedback, ACK/NACK feedback, TX-RX distance based NACK only feedback), SL mode 1 CG type (e.g., SL CG type 1/2), etc. element/parameter. For example, parameters related to various embodiments of the present disclosure may be specifically or differently configured or allowed for at least one of service type, priority, requirement, HARQ feedback enabled, HARQ feedback disabled, LCH/MAC PDU, resource pool CBR measurement value, SL cast type (e.g., unicast, groupcast, broadcast), SL groupcast HARQ feedback options (e.g., NACK only feedback, ACK/NACK feedback, TX-RX distance based NACK only feedback), SL mode 1 CG type (e.g., SL CG type 1/2), etc. element/parameter.

Also, for example, in this disclosure, "Configuration" or "designation" may take the form of a base station informing a UE over a predefined physical layer channel/signal or higher layer channel/signal (e.g., SIB, RRC, MAC CE). For example, a "configuration" or "designation" may include a form in which something is being provided by a pre-configuration, or a form in which a UE informs another UE something via a predefined physical layer channel/signal or higher layer channel/signal (e.g., SL MAC CE, PC5 RRC).

Further, the various embodiments of the present disclosure may be combined with each other.

In various embodiments of the present disclosure, the SL DRX timers mentioned below may be used for the following purposes.

For example, an SL DRX on-duration timer may be used in intervals where a UE performing SL DRX operation needs to operate with a default active time to receive PSCCH/PSSCH from another UE.

For example, an SL DRX inactivity timer may be used in an interval to extend an SL DRX endurance interval, which is an interval during which a UE performing SL DRX operation must operate as active time by default to receive PSCCH/PSSCH from another UE, i.e., for example, it may extend the SL DRX endurance timer by the SL DRX inactivity timer interval. In addition, when a UE receives a new packet (e.g., a new PSSCH) from another UE, it may start an SL DRX inactivity timer to extend an SL DRX endurance timer. For example, an SL DRX HARQ RTT timer may be used in intervals where a UE performing SL DRX operation is operating in sleep mode until it receives a retransmission packet (or PSSCH assignment) from another UE. That is, for example, when a UE may start an SL DRX HARQ RTT timer, it may determine that the counterpart UE will not transmit a sidelink retransmission packet to it until the SL DRX HARQ RTT timer expires, and the UE may operate in sleep mode during that timer.

For example, an SL DRX retransmission timer may be used during an interval when a UE performing SL DRX operation is operating as active time to receive retransmission packets (or PSSCH assignments) transmitted by the counterpart UE. For example, during the SL DRX retransmission timer interval, the UE may monitor the reception of retransmission sidelink packets (or PSSCH assignments) transmitted by the counterpart UE.

Various embodiments of the present disclosure may be applied to a UE-Pair Specific SL DRX configuration, a UE-Pair Specific SL DRX pattern, parameters included in a UE-Pair Specific SL DRX configuration, and timers included in a UE-Pair Specific SL DRX configuration, not just for a Default/Common SL DRX configuration, a Default/Common SL DRX pattern, parameters included in a Default/Common SL DRX configuration, or timers included in a Default/Common SL DRX configuration.

Also, in the present disclosure, for example, an "On-duration" may be an interval of Active Time. For example, an active time may be an interval during which an RF module is operating in a wake up state (i.e., "on") to receive/transmit radio signals. For example, an "Off-duration" may be a Sleep Time interval. For example, a Sleep Time interval may be an interval during which an RF module operates in a sleep mode state (the RF module is "off") to save power. For example, a sleep time interval may not imply that a transmitting UE is obligated to operate in sleep mode during the sleep time interval. For example, a UE may be permitted to operate as active time for a short period of time for sensing operations/transmission operations, if required, even during sleep time.

Further, for example, whether the various embodiments of the present disclosure are applied may be configured differently or independently according to a resource pool, congestion level, service priority, service type, QoS requirement (e.g., latency, reliability), PQI, traffic type (e.g., periodic generation, aperiodic generation), or SL transmission resource allocation mode (mode 1, mode 2). For example, parameters (e.g., thresholds) related to various embodiments of the present disclosure may be configured differently or independently according to a resource pool, a congestion level, a service priority, a service type, a QoS requirement (e.g., latency, reliability), a PQI, a traffic type (e.g., periodic generation, aperiodic generation), or an SL transmission resource allocation mode (e.g., mode 1, mode 2).

For example, whether the various embodiments of the present disclosure are applied may be configured independently or differently for at least one of a resource pool (e.g., PSFCH-enabled resource pool, non-PSFCH-enabled resource pool), service/packet type, priority, QoS requirements (e.g., URLLC/EMBB traffic, reliability, latency), PQI, PFI, cast type (e.g., unicast, groupcast, broadcast), congestion level (e.g., CBR), resource pool congestion level, SL HARQ feedback method (e.g., feedback NACK only, feedback ACK/NACK), MAC PDU transmission with HARQ feedback enabled, MAC PDU transmission with HARQ feedback disabled, whether to enable PUCCH-based SL HARQ feedback reporting operation, whether to perform pre-emption, and whether to perform re-evaluation, pre-emption-based resource reselection, re-evaluation-based resource reselection, L1 source identifier, L1 destination identifier, L2 source identifier, L2 destination identifier, combination identifier of L1 source layer ID and L1 destination layer ID, combination identifier of L2 source layer ID and L2 destination layer ID, combination identifier of pair of L1 source layer ID and L1 destination layer ID and cast type, combination identifier of pair of L2 source layer ID and L2 destination layer ID and cast type, PC5 RRC connection/link, whether SL DRX is performed, whether SL DRX is supported, SL mode type (resource allocation mode 1, resource allocation mode 2), reservation operation of periodic resources or reservation operation of aperiodic resources.

For example, parameter configuration values related to various embodiments of the present disclosure may be configured independently or differently for at least one of a resource pool (e.g., PSFCH-enabled resource pool, non-PSFCH-enabled resource pool), service/packet type, priority, QoS requirements (e.g., URLLC/EMBB traffic, reliability, latency), PQI, PFI, cast type (e.g., unicast, groupcast, broadcast), congestion level (e.g., CBR), resource pool congestion level, SL HARQ feedback method (e.g., feedback NACK only, feedback ACK/NACK), MAC PDU transmission with HARQ feedback enabled, MAC PDU transmission with HARQ feedback disabled, whether to enable PUCCH-based SL HARQ feedback reporting operation, whether to perform pre-emption, and whether to perform re-evaluation, pre-emption-based resource reselection, re-evaluation-based resource reselection, L1 source identifier, L1 destination identifier, L2 source identifier, L2 destination identifier, combination identifier of L1 source layer ID and L1 destination layer ID, combination identifier of L2 source layer ID and L2 destination layer ID, combination identifier of pair of L1 source layer ID and L1 destination layer ID and cast type, combination identifier of pair of L2 source layer ID and L2 destination layer ID and cast type, PC5 RRC connection/link, whether SL DRX is performed, whether SL DRX is supported, SL mode type (resource allocation mode 1, resource allocation mode 2), reservation operation of periodic resources or reservation operation of aperiodic resources.

In the present disclosure, for example, a "certain time" may be a period of time during which a UE operates as an Active Time for a predefined amount of time to receive sidelink signaling or sidelink data from another UE. For example, a "certain time" may be a period of time during which a UE operates as active time for a timer (SL DRX retransmission timer, SL DRX inactivity timer, timer that ensures that an RX UE operates as active time in DRX operation) time to receive sidelink signaling or sidelink data from another UE.

Various embodiments of the present disclosure may be applied to millimeter wave (mmWave) SL operation. Whether the various embodiments of the present disclosure are applied may be applied to millimeter wave (mmWave) SL operation. The parameter configuration values related to the various embodiments of the present disclosure may be applied to millimeter wave (mmWave) SL operation.

FIG. 9 shows a procedure for a transmitting UE to transmit a MAC PDU, according to one embodiment of the present disclosure. The embodiment of FIG. 9 may be combined with various embodiments of the present disclosure.

Referring to FIG. 9, in step S910, a transmitting UE may select a first resource. For example, a transmitting UE may select a first resource within a first selection window, based on sensing. Or, for example, a transmitting UE may randomly select a first resource.

In step S920, a transmitting UE may generate a first medium access control (MAC) protocol data unit (PDU) based on at least one logical channel (LCH). For example, a transmitting UE may generate a MAC PDU based on at least one LCH in which hybrid automatic repeat request (HARQ) feedback is enabled. Or, for example, a transmitting UE may generate a MAC PDU based on at least one LCH in which HARQ feedback is disabled.

In step S930, a transmitting UE may transmit, to a receiving UE, first sidelink control information (SCI) for scheduling a first physical sidelink shared channel (PSSCH), through a first physical sidelink control channel (PSCCH), based on the first resource.

In step S940, a transmitting UE may transmit, to a receiving UE, second SCI and the first MAC PDU, through the first PSSCH, based on the first resource.

For example, random selection for the first resource may be not allowed, based on HARQ feedback being enabled in the at least one LCH.

For example, random selection for the first resource may be allowed, based on HARQ feedback being disabled in the at least one LCH.

Or, for example, random selection and partial sensing for the first resource may be allowed, based on HARQ feedback being disabled in the at least one LCH.

For example, the sensing may include partial sensing. For example, for partial sensing, a transmitting UE may determine at least one first candidate slot within the first selection window. For example, a transmitting UE may perform the sensing for at least one first sensing slot related to the at least one candidate slot.

For example, a first LCH related to the first MAC PDU may be an LCH with a highest priority among the at least one LCH. For example, the priority of the first LCH may be a higher priority than a pre-configured threshold. For example, the sensing may be allowed based on the first LCH with the priority higher than a pre-configured threshold, among the at least one LCH in which HARQ feedback is enabled.

For example, remaining amount of a battery of a transmitting UE may be greater than a pre-configured threshold. For example, the sensing may be allowed, based on HARQ feedback being enabled in the at least one LCH, and remaining amount of a battery of a transmitting UE being greater than a pre-configured threshold.

For example, a channel busy ratio (CBR) measurement value of a resource pool related to the first LCH may be greater than a pre-configured threshold. For example, the sensing may be allowed, based on a first LCH with a CBR value of a resource pool greater than a pre-configured threshold, among the at least one LCH in which HARQ feedback is enabled.

FIG. 10 shows a procedure for a transmitting UE to retransmit a MAC PDU, according to one embodiment of the present disclosure. The embodiment of FIG. 10 may be combined with various embodiments of the present disclosure.

Referring to FIG. 10, in step S1010, a transmitting UE may select a first resource. For example, a transmitting UE may select a first resource within a first selection window based on sensing. Alternatively, for example, a transmitting UE may randomly select a first resource.

In step S1020, a transmitting UE may generate a MAC PDU based on at least one LCH. For example, a transmitting UE may generate a MAC PDU based on the at least one LCH in which HARQ feedback is enabled.

In step S1030, a transmitting UE may transmit, to a receiving UE, first SCI for scheduling a first PSSCH, through a first PSCCH, based on the first resource.

In step S1040, a transmitting UE may transmit, to a receiving UE, second SCI and the MAC PDU, through the first PSSCH, based on the first resource.

For example, random selection for the first resource may be not allowed, based on HARQ feedback being enabled in the at least one LCH.

For example, the sensing may include partial sensing. For example, for partial sensing, a transmitting UE may determine at least one first candidate slot within the first selection window. For example, a transmitting UE may perform the sensing for at least one first sensing slot related to the at least one candidate slot.

For example, a first LCH related to the MAC PDU may be an LCH with a highest priority among the at least one LCH. For example, the priority of the first LCH may be a higher priority than a pre-configured threshold. For example, the sensing may be allowed based on the first LCH with the priority higher than a pre-configured threshold, among the at least one LCH in which HARQ feedback is enabled.

For example, remaining amount of a battery of a transmitting UE may be greater than a pre-configured threshold. For example, the sensing may be allowed, based on HARQ feedback being enabled in the at least one LCH, and remaining amount of a battery of a transmitting UE being greater than a pre-configured threshold.

For example, a CBR measurement value of a resource pool related to the first LCH may be greater than a pre-configured threshold. For example, the sensing may be allowed, based on a first LCH with a CBR value of a resource pool greater than a pre-configured threshold, among the at least one LCH in which HARQ feedback is enabled.

In step S1050, a transmitting UE may receive a HARQ NACK for a MAC PDU from a receiving UE over the physical sidelink feedback channel (PSFCH).

In step S1060, a transmitting UE may select a second resource for retransmitting a MAC PDU. For example, a transmitting UE may perform sensing to select a second resource for retransmitting a MAC PDU based on the received HARQ NACK. For example, a transmitting UE may select a second resource for retransmitting a MAC PDU within a second selection window based on sensing.

In step S1070, a transmitting UE may retransmit a MAC PDU to a receiving UE.

FIG. 11 shows a procedure for a transmitting UE to transmit a plurality of MAC PDUs, according to one embodiment of the present disclosure. The embodiment of FIG. 11 may be combined with various embodiments of the present disclosure.

Referring to FIG. 11, in step S1110, a transmitting UE may generate a plurality of MAC PDUs.

For example, a transmitting UE may select a first resource. For example, a transmitting UE may select a first resource within a first selection window, based on first sensing. For example, a transmitting UE may randomly select a third resource.

For example, a transmitting UE may generate a first MAC PDU based on at least one LCH in which hybrid automatic repeat request (HARQ) feedback is enabled. For example, a transmitting UE may generate a second MAC PDU based on at least one LCH in which HARQ feedback is disabled.

For example, random selection for the first resource may be not allowed, based on HARQ feedback being enabled in at least one LCH. For example, random selection for the third resource may be allowed, based on HARQ feedback being disabled in at least one LCH. Or, for example, random selection and partial sensing for the third resource may be allowed, based on HARQ feedback being disabled in at least one LCH.

For example, the first sensing may include partial sensing. For example, for partial sensing, a transmitting UE may determine at least one first candidate slot within the first selection window. For example, a transmitting UE may perform the first sensing for at least one first sensing slot related to the at least one first candidate slot.

For example, a first LCH related to the first MAC PDU may be an LCH with a highest priority among the at least one LCH. For example, the priority of the first LCH may be a higher priority than a pre-configured threshold. For example, the first sensing may be allowed based on the first LCH with the priority higher than a pre-configured threshold, among the at least one LCH in which HARQ feedback is enabled.

For example, remaining amount of a battery of a transmitting UE may be greater than a pre-configured threshold. For example, the first sensing may be allowed, based on HARQ feedback being enabled in the at least one LCH, and remaining amount of a battery of a transmitting UE being greater than a pre-configured threshold.

For example, a channel busy ratio (CBR) measurement value of a resource pool related to the first LCH may be greater than a pre-configured threshold. For example, the first sensing may be allowed, based on a first LCH with a CBR value of a resource pool greater than a pre-configured threshold, among the at least one LCH in which HARQ feedback is enabled.

For example, sensing for a third resource for transmitting the second MAC PDU may be allowed, based on a priority related to the second MAC PDU being a priority higher than a pre-configured threshold.

For example, the third resource may be selected, based on resource selection type for the at least one LCH in which HARQ feedback is disabled. For example, the resource selection type may include a type of selecting a resource by sensing and a type of selecting a resource by random selection. For example, the resource selection type may be configured based on a sidelink service from a higher layer.

For example, the at least one LCH may be multiplexed into the same MAC PDU based on the at least one LCH having the same Destination ID. For example, the at least one LCH may be multiplexed into the same MAC PDU based on being of the same cast type. For example, resource for transmitting the multiplexed MAC PDU may be selected, based on a resource selection type related to the highest priority LCH of the at least one LCH.

In step S1120, a transmitting UE may transmit a plurality of MAC PDUs to a receiving UE.

For example, a transmitting UE may transmit, to a receiving UE, first sidelink control information (SCI) for scheduling a first physical sidelink shared channel (PSSCH), through a first physical sidelink control channel (PSCCH), based on the first resource. For example, a transmitting UE may transmit, to a receiving UE, third SCI for scheduling of a second PSSCH, through a second PSCCH, based on the third resource. Here, for example, an SCI format of first SCI and third SCI may be 1-A. For example, first SCI and third SCI may be 1st-stage-SCI.

For example, a transmitting UE may transmit, to a receiving UE, second SCI and the first MAC PDU, through the first PSSCH, based on the first resource. For example, a transmitting UE may transmit, to a receiving UE, fourth SCI and the second MAC PDU, through the second PSSCH, based on the third resource. Here, for example, an SCI format of second SCI and fourth SCI may be 2-A or 2-B. For example, second SCI and fourth SCI may be 2nd-stage-SCI.

For example, a transmitting UE may receive a HARQ feedback for the first MAC PDU through a PSFCH. For example, a transmitting UE may perform second sensing for selecting a second resource for retransmitting the first MAC PDU, based on the HARQ feedback being negative-acknowledgement (NACK). For example, a transmitting UE may the second resource within a second selection window based on the second sensing.

FIG. 12 shows a method for a first device to transmit a MAC PDU, according to one embodiment of the present disclosure. The embodiment of FIG. 12 may be combined with various embodiments of the present disclosure.

Referring to FIG. 12, in step S1210, a first device 100 may select a first resource within a first selection window, based on first sensing.

In step S1220, a first device 100 may generate a first MAC PDU based on at least one LCH in which HARQ feedback is enabled.

In step S1230, a first device 100 may transmit, to a second device 200, first SCI for scheduling a first PSSCH, through a first PSCCH, based on the first resource.

In step S1240, a first device 100 may transmit, to a second device 200, second SCI and the first MAC PDU, through the first PSSCH, based on the first resource.

For example, random selection for the first resource may be not allowed, based on HARQ feedback being enabled in the at least one LCH.

For example, a first device 100 may receive a HARQ feedback for the first MAC PDU through a physical sidelink feedback channel (PSFCH).

For example, the first sensing may include partial sensing.

For example, second sensing for selecting a second resource for retransmitting the first MAC PDU may be performed, based on the HARQ feedback being negative-acknowledgement (NACK). For example, the second resource may be selected within a second selection window based on the second sensing.

For example, a first LCH related to the first MAC PDU may be an LCH with a highest priority among the at least one LCH. For example, the priority of the first LCH may be a higher priority than a pre-configured threshold. For example, a channel busy ratio (CBR) measurement value of a resource pool related to the first LCH may be greater than a pre-configured threshold.

For example, remaining amount of a battery of a first device 100 may be greater than a pre-configured threshold.

For example, a first device 100 may transmit, to a second device 200, third SCI for scheduling of a second PSSCH, through a second PSCCH. For example, a first device 100 may transmit, to a second device 200, fourth SCI and a second MAC PDU, through the second PSSCH. For example, the second MAC PDU may be generated based on at least one LCH in which HARQ feedback is disabled. For example, sensing for a third resource for transmitting the second MAC PDU is allowed, based on a priority related to the second MAC PDU being a priority higher than a pre-configured threshold. For example, random selection for a third resource for transmitting the second MAC PDU may be allowed. For example, sensing and random selection for a third resource for transmitting the second MAC PDU may be allowed. For example, the third resource may be selected, based on resource selection type for the at least one LCH in which HARQ feedback is disabled. For example, the resource selection type may include a type of selecting a resource by sensing and a type of selecting a resource by random selection. For example, the resource selection type may be configured based on a sidelink service from a higher layer.

The embodiments described above may be applied to various devices described below. For example, a processor 102 of a first device 100 may select a first resource within a first selection window, based on first sensing. And, for example, a processor 102 of a first device 100 may generate a first MAC PDU based on at least one LCH in which HARQ feedback is enabled. And, for example, a processor 102 of a first device 100 may control a transceiver 106 to transmit, to a second device 200, first SCI for scheduling a first PSSCH, through a first PSCCH, based on the first resource. And, for example, a processor 102 of a first device 100 may control a transceiver 106 to transmit, to a second device 200, second SCI and the first MAC PDU, through the first PSSCH, based on the first resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: select a first resource within a first selection window, based on first sensing; generate a first medium access control (MAC) protocol data unit (PDU) based on at least one logical channel (LCH) in which hybrid automatic repeat request (HARQ) feedback is enabled; transmit, to a second device, first sidelink control information (SCI) for scheduling a first physical sidelink shared channel (PSSCH), through a first physical sidelink control channel (PSCCH), based on the first resource; and transmit, to the second device, second SCI and the first MAC PDU, through the first PSSCH, based on the first resource. For example, random selection for the first resource may be not allowed, based on HARQ feedback being enabled in the at least one LCH.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: select a first resource within a first selection window, based on first sensing; generate a first medium access control (MAC) protocol data unit (PDU) based on at least one logical channel (LCH) in which hybrid automatic repeat request (HARQ) feedback is enabled; transmit, to a second UE, first sidelink control information (SCI) for scheduling a first physical sidelink shared channel (PSSCH), through a first physical sidelink control channel (PSCCH), based on the first resource; and transmit, to the second UE, second SCI and the first MAC PDU, through the first PSSCH, based on the first resource. For example, random selection for the first resource may be not allowed, based on HARQ feedback being enabled in the at least one LCH.

According to an embodiment of the present disclosure, a non-transitory computer-readable storage medium storing instructions may be proposed. For example, the instructions, when executed, may cause a first device to: select a first resource within a first selection window, based on first sensing; generate a first medium access control (MAC) protocol data unit (PDU) based on at least one logical channel (LCH) in which hybrid automatic repeat request (HARQ) feedback is enabled; transmit, to a second device, first sidelink control information (SCI) for scheduling a first physical sidelink shared channel (PSSCH), through a first physical sidelink control channel (PSCCH), based on the first resource; and transmit, to the second device, second SCI and the first MAC PDU, through the first PSSCH, based on the first resource. For example, random selection for the first resource may be not allowed, based on HARQ feedback being enabled in the at least one LCH.

FIG. 13 shows a method for a second device to receive a MAC PDU, according to one embodiment of the present disclosure. The embodiment of FIG. 13 may be combined with various embodiments of the present disclosure.

Referring to FIG. 13, in step S1310, a second device 200 may receive, from a first device 100, first sidelink control information (SCI) for scheduling a first physical sidelink shared channel (PSSCH), through a first physical sidelink control channel (PSCCH).

In step S1320, a second device 200 may receive, from a first device 100, second SCI and a first medium access control (MAC) protocol data unit (PDU), through the first PSSCH.

For example, a first resource may be selected within a first selection window, based on first sensing. For example, the first MAC PDU may be transmitted based on the first resource. For example, the first MAC PDU may be generated based on at least one logical channel (LCH) in which hybrid automatic repeat request (HARQ) feedback is enabled. For example, random selection for the first resource may be not allowed, based on HARQ feedback being enabled in the at least one LCH.

For example, a second device 200 may transmit a HARQ feedback for the first MAC PDU through a physical sidelink feedback channel (PSFCH).

For example, the first sensing may include partial sensing.

For example, second sensing for selecting a second resource for retransmitting the first MAC PDU may be performed, based on the HARQ feedback being negative-acknowledgement (NACK). For example, the second resource may be selected within a second selection window based on the second sensing.

For example, a first LCH related to the first MAC PDU may be an LCH with a highest priority among the at least one LCH. For example, the priority of the first LCH may be a higher priority than a pre-configured threshold. For example, a channel busy ratio (CBR) measurement value of a resource pool related to the first LCH may be greater than a pre-configured threshold.

For example, a second device 200 may receive, from a first device 100, third SCI for scheduling of a second PSSCH, through a second PSCCH. For example, a second device 200 may receive, from a first device 100, fourth SCI and a second MAC PDU, through the second PSSCH. For example, the second MAC PDU may be generated based on at least one LCH in which HARQ feedback is disabled. For example, sensing for a third resource for transmitting the second MAC PDU may be allowed, based on a priority related to the second MAC PDU being a priority higher than a pre-configured threshold. For example, random selection for a third resource for transmitting the second MAC PDU may be allowed. For example, sensing and random selection for a third resource for transmitting the second MAC PDU may be allowed. For example, the third resource may be selected, based on resource selection type for the at least one LCH in which HARQ feedback is disabled. For example, the resource selection type may include a type of selecting a resource by sensing and a type of selecting a resource by random selection. For example, the resource selection type may be configured based on a sidelink service from a higher layer.

The embodiments described above may be applied to various devices described below. For example, a processor 202 of a second device 200 may control a transceiver 206 to receive, from a first device 100, first sidelink control information (SCI) for scheduling a first physical sidelink shared channel (PSSCH), through a first physical sidelink control channel (PSCCH). And, for example, a processor 202 of a second device 200 may control a transceiver 206 to receive, from a first device 100, second SCI and a first medium access control (MAC) protocol data unit (PDU), through the first PSSCH.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, first sidelink control information (SCI) for scheduling a first physical sidelink shared channel (PSSCH), through a first physical sidelink control channel (PSCCH); and receive, from the first device, second SCI and a first medium access control (MAC) protocol data unit (PDU), through the first PSSCH. For example, a first resource may be selected within a first selection window, based on first sensing, the first MAC PDU may be transmitted based on the first resource. For example, the first MAC PDU may be generated based on at least one logical channel (LCH) in which hybrid automatic repeat request (HARQ) feedback is enabled. For example, random selection for the first resource may be not allowed, based on HARQ feedback being enabled in the at least one LCH.

Various embodiments of the present disclosure may be combined with each other.

Various embodiments of the present disclosure may be implemented independently. Alternatively, various embodiments of the present disclosure may be implemented in combination or merged with each other. For example, various embodiments of the present disclosure have been described based on a 3GPP system for convenience of description, but various embodiments of the present disclosure may be extendable to systems other than the 3GPP system. For example, various embodiments of the present disclosure are not limited to direct UE-to-UE communication, but may also be used in uplink or downlink, where a base station, relay node, or the like may use the proposed methods according to various embodiments of the present disclosure. For example, information regarding whether a method according to various embodiments of the disclosure applies may be defined to be communicated by a base station to a UE, or by a second device 200 to a receiving UE, via a predefined signal (e.g., physical layer signal or higher layer signal). For example, information regarding rules according to various embodiments of the present disclosure may be defined to be communicated by a base station to a UE, or by a second device 200 to a receiving UE, via a predefined signal (e.g., a physical layer signal or a higher layer signal).

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 19 shows a communication system 1, based on an embodiment of the present disclosure. The embodiment of FIG. 19 may be combined with various embodiments of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 19 shows wireless devices, based on an embodiment of the present disclosure. The embodiment of FIG. 19 may be combined with various embodiments of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document.

Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 20 shows a signal process circuit for a transmission signal, based on an embodiment of the present disclosure. The embodiment of FIG. 20 may be combined with various embodiments of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 21 shows another example of a wireless device, based on an embodiment of the present disclosure. The wireless device may be implemented in various forms according to a use-case/service (refer to FIG. 19). The embodiment of FIG. 21 may be combined with various embodiments of the present disclosure.

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 22 may be combined with various embodiments of the present disclosure.

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 23 may be combined with various embodiments of the present disclosure.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information regarding a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

selecting a first resource within a first selection window, based on first sensing;

generating a first medium access control (MAC) protocol data unit (PDU) based on at least one logical channel (LCH) in which hybrid automatic repeat request (HARQ) feedback is enabled, wherein a first LCH with a highest priority and a second LCH with the highest priority are included in the at least one LCH, and wherein whether sidelink (SL) discontinuous reception (DRX) is applied to the first MAC PDU is determined based on SL DRX being enabled to the first LCH with a minimum required communication distance longer than the second LCH;

transmitting, to a second device, first sidelink control information (SCI) for scheduling a first physical sidelink shared channel (PSSCH), through a first physical sidelink control channel (PSCCH), based on the first resource; and transmitting, to the second device, second SCI and the first MAC PDU, through the first PSSCH, based on the first resource, wherein random selection for the first resource is not allowed, based on HARQ feedback being enabled in the at least one LCH.

2. The method of claim 1, further comprising:

receiving a HARQ feedback for the first MAC PDU through a physical sidelink feedback channel (PSFCH), wherein the first sensing includes partial sensing.

3. The method of claim 2, wherein second sensing for selecting a second resource for retransmitting the first MAC PDU is performed, based on the HARQ feedback being negative-acknowledgement (NACK), wherein the second resource is selected within a second selection window based on the second sensing.

4. The method of claim 1, wherein the priority of the first LCH is a higher priority than a pre-configured threshold.

5. The method of claim 1, wherein remaining amount of a battery is greater than a pre-configured threshold.

6. The method of claim 1, wherein a channel busy ratio (CBR) measurement value of a resource pool related to the first LCH is greater than a pre-configured threshold.

7. The method of claim 1, further comprising:

transmitting, to the second device, third SCI for scheduling of a second PSSCH, through a second PSCCH; and transmitting, to the second device, fourth SCI and a second MAC PDU, through the second PSSCH, wherein the second MAC PDU is generated based on at least one LCH in which HARQ feedback is disabled.

8. The method of claim 7, wherein sensing for a third resource for transmitting the second MAC PDU is allowed, based on a priority related to the second MAC PDU being a priority higher than a pre-configured threshold.

9. The method of claim 7, wherein random selection for a third resource for transmitting the second MAC PDU is allowed.

10. The method of claim 7, wherein sensing and random selection for a third resource for transmitting the second MAC PDU are allowed.

11. The method of claim 10, wherein the third resource is selected, based on resource selection type for the at least one LCH in which HARQ feedback is disabled, and wherein the resource selection type includes a type of selecting a resource by sensing and a type of selecting a resource by random selection.

12. The method of claim 11, wherein the resource selection type is configured based on a sidelink service from a higher layer.

13. A first device comprising:

one or more processors;

one or more transceivers; and one or more memories connected to the one or more processors and storing instructions, wherein the instructions, based on being executed by the one or more processors, cause the first device to:

select a first resource within a first selection window, based on first sensing;

generate a first medium access control (MAC) protocol data unit (PDU) based on at least one logical channel (LCH) in which hybrid automatic repeat request (HARQ) feedback is enabled, wherein a first LCH with a highest priority and a second LCH with the highest priority are included in the at least one LCH, and wherein whether sidelink (SL) discontinuous reception (DRX) is applied to the first MAC PDU is determined based on SL DRX being enabled to the first LCH with a minimum required communication distance longer than the second LCH;

transmit, to a second device, first sidelink control information (SCI) for scheduling a first physical sidelink shared channel (PSSCH), through a first physical sidelink control channel (PSCCH), based on the first resource; and transmit, to the second device, second SCI and the first MAC PDU, through the first PSSCH, based on the first resource, wherein random selection for the first resource is not allowed, based on HARQ feedback being enabled in the at least one LCH.

14. A processing device adapted to control a first device, the processing device comprising:

one or more processors; and one or more memories connected to the one or more processors and storing instructions, wherein the instructions, based on being executed by the one or more processors, cause the first device to:

select a first resource within a first selection window, based on first sensing;

generate a first medium access control (MAC) protocol data unit (PDU) based on at least one logical channel (LCH) in which hybrid automatic repeat request (HARQ) feedback is enabled, wherein a first LCH with a highest priority and a second LCH with the highest priority are included in the at least one LCH, and wherein whether sidelink (SL) discontinuous reception (DRX) is applied to the first MAC PDU is determined based on SL DRX being enabled to the first LCH with a minimum required communication distance longer than the second LCH;

transmit, to a second device, first sidelink control information (SCI) for scheduling a first physical sidelink shared channel (PSSCH), through a first physical sidelink control channel (PSCCH), based on the first resource; and transmit, to the second device, second SCI and the first MAC PDU, through the first PSSCH, based on the first resource, wherein random selection for the first resource is not allowed, based on HARQ feedback being enabled in the at least one LCH.

* * * * *